US008103186B2

(12) United States Patent
Andoh et al.

(10) Patent No.: US 8,103,186 B2

(45) Date of Patent: Jan. 24, 2012

(54) IMAGE FORMING APPARATUS

(75) Inventors: Takayuki Andoh, Kawasaki (JP); Takuji Takahashi, Yokohama (JP); Takamasa Shiraki, Yokohama (JP); Yoshihide Ohta, Sagamihara (JP); Kohji Hatayama, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 666 days.

(21) Appl. No.: 12/213,095

(22) Filed: Jun. 13, 2008

(65) Prior Publication Data

US 2008/0317498 A1 Dec. 25, 2008

(30) Foreign Application Priority Data

| | | |
|---|---|---|
| Jun. 22, 2007 | (JP) | 2007-165544 |
| Jul. 9, 2007 | (JP) | 2007-180236 |
| Jan. 30, 2008 | (JP) | 2008-019844 |
| Jan. 31, 2008 | (JP) | 2008-021959 |

(51) Int. Cl.
*G03G 15/00* (2006.01)
*G06F 3/12* (2006.01)

(52) U.S. Cl. ....... 399/110; 399/107; 399/126; 358/1.13; 358/401; 358/408; 358/471; 358/474

(58) Field of Classification Search .................. 399/107, 399/110, 126; 358/1.13, 401, 408, 471, 496
See application file for complete search history.

(56) References Cited

U.S. PATENT DOCUMENTS

| | | | | |
|---|---|---|---|---|
| 5,956,160 A * | 9/1999 | Watanabe | 358/496 |
| 6,144,468 A * | 11/2000 | Watanabe | 358/496 |
| 7,263,312 B2 * | 8/2007 | Park | 399/124 |
| 2005/0219656 A1 * | 10/2005 | Sato | 358/498 |
| 2006/0203293 A1 * | 9/2006 | Yasue et al. | 358/296 |
| 2007/0121173 A1 * | 5/2007 | Manabe et al. | 358/450 |
| 2007/0285741 A1 * | 12/2007 | Sato et al. | 358/497 |

FOREIGN PATENT DOCUMENTS

| | | |
|---|---|---|
| JP | 05-197225 | 8/1993 |
| JP | 05-219308 | 8/1993 |
| JP | 10-063053 | 3/1998 |
| JP | 10-290311 | 10/1998 |
| JP | 2001-034141 | 2/2001 |
| JP | 2001-036680 | 2/2001 |
| JP | 2001-343880 | 12/2001 |
| JP | 2003-058019 | 2/2003 |
| JP | 2004-264500 | 9/2004 |

(Continued)

*Primary Examiner* — David Gray
*Assistant Examiner* — Francis Gray
(74) *Attorney, Agent, or Firm* — Harness, Dickey & Pierce P.L.C.

(57) ABSTRACT

An image forming apparatus including an image forming section; an upper unit located over the image forming section with a space therebetween and slidable in a direction of from the front side to the rear side of the apparatus and the opposite direction; a sheet discharger configured to discharge a sheet bearing an image in the first or opposite direction; a sheet stacker receiving the sheet from the sheet discharger; a support arranged outside of both side ends of the sheet stacker in the first direction and slidably supporting the upper unit; and at least one of a release preventing member for preventing releasing of the upper unit from the support, and a covering member movable from a first position to a second position in conjunction with sliding of the upper unit and covering an opening formed at an end portion of the support when acquiring the first position.

20 Claims, 28 Drawing Sheets

FOREIGN PATENT DOCUMENTS

| | | |
|---|---|---|
| JP | 2004-354832 | 12/2004 |
| JP | 2005-020374 | 1/2005 |
| JP | 2005-167801 | 6/2005 |
| JP | 2005-182032 | 7/2005 |
| JP | 2006-119474 | 5/2006 |
| JP | 2006-148370 | 6/2006 |
| JP | 2006-240848 | 9/2006 |
| JP | 2006-330356 | 12/2006 |

* cited by examiner

IMAGE FORMING APPARATUS

BACKGROUND OF THE INVENTION

1. Field of the Invention

The present invention relates to an image forming apparatus such as copiers, facsimiles, printers and plotters. In addition, the present invention also relates to a complex image forming apparatus having two or more of copying, facsimiling, printing and plotting functions.

2. Discussion of the Background

Cavity type image forming apparatuses, in which a copy tray configured to receive and store copy sheets is formed on an upper surface of a main body serving as an image forming section, and an image reading section configured to read images of original documents is located over the copy tray with a space (i.e., cavity) therebetween, have been used for copiers, facsimiles, printers and plotters. For example, published unexamined Japanese patent applications Nos. (hereinafter referred to as JP-A) 05-219308 and 2005-167801 have disclosed such cavity type image forming apparatuses. In general, such cavity type image forming apparatuses have an advantage of space-saving, but have drawbacks such that the copy sheets on the copy tray cannot be well observed by operators (i.e., the visibility of the copy sheets is bad), and poor discharge properties such that jamming of the copy sheets tends to occur at the copy tray, and a large amount of copy sheets cannot be stored in the copy tray.

JP-A 2005-167801 discloses a cavity type image forming apparatus having configuration-such that the upper unit (i.e., image reading section or scanner) of the image forming apparatus can be opened while pivoted so that the consumable supplies such as process cartridges and transfer units in the main body can be replaced with new ones. The image forming apparatus has the following drawbacks:

(1) Since the upper unit extends toward the exit of the copy tray, the visibility of the copy sheets on the copy tray (hereinafter referred to as copy visibility) is bad.

(2) When replacing the process cartridge and/or transfer unit, the copy tray has to be opened after opening the upper unit, wherein the copy tray and the upper unit have different pivot axes. Thus, the image forming apparatus has complex configuration. Since the transfer unit is pivoted together with the pivoted unit, it is necessary to open the unit at a high angle to replace the consumable supplies.

(3) Since the exit of the copy tray is positioned on a relatively high level and the flat surface of the copy tray is located on a relatively low level while the upper unit extends toward the exit of the copy tray, the copy visibility is bad.

(4) When replacing the toner bottle, the upper unit and the copy tray have to be pivoted. In addition, the gap between the surface of the copy tray and the upper surface of exit of the copy tray is small, and therefore a large amount of copy sheets cannot be stored on the copy tray. Further, the copy sheets cannot be well observed from the front side of the image forming apparatus.

(5) Although the upper unit can be slid to replace the toner bottle, the copy visibility cannot be improved thereby.

(6) The scanner is easily pivoted and opened when receiving an upward force.

(7) The image forming apparatus uses a number of parts such as slide rails and rollers, resulting in increase of the manufacturing costs.

(8) There is a risk such that operator's fingers are wedged between the scanner and the image forming when the scanner is slid.

JP-A 05-219308 (i.e., Japanese patent No. 3176411) discloses a cavity type image forming apparatus in which a scanner is arranged over a copy tray. Therefore, the copy visibility is not good. In order to improve the copy visibility, the scanner is slid to the rear side. Since the sliding mechanism is provided below the scanner and above the copy tray, the height of the image forming apparatus is relatively high. The finger wedging risk mentioned above is not eliminated.

JP-A 2006-119474 discloses a cavity type image forming apparatus in which the scanner is pivoted and copy sheets are discharged to the copy tray from the rear side of the apparatus. Therefore, when a small-size copy sheet is produced, the copy sheet on the copy tray cannot be absolutely observed from the front side of the apparatus because the exit of the copy tray is located on a relatively high level compared to the copy discharging exit through which copy sheets are discharged to the copy tray from the main body. In addition, a receiving material sheet on which an image is to be formed is fed from a lower side of the apparatus to the copy tray through the rear side of the apparatus. Therefore, when jamming occurs, it is not easy to remove the jammed sheet from the apparatus. Particularly, in a case where a small-size copy sheet is jammed, the jammed sheet cannot be accessed unless the scanner is opened while pivoted. In addition, the finger wedging risk mentioned above is not eliminated.

JP-A 2005-182032 discloses a cavity type image forming apparatus in which the scanner is pivoted and copy sheets are discharged to the copy tray from the rear side of the apparatus. Similarly to the image forming apparatus disclosed by JP-A 2006-119474, a small-size copy sheet on the copy tray cannot be absolutely observed from the front side of the apparatus. In addition, it is difficult to take such a small-size copy sheet from the copy tray unless the scanner is opened while pivoted. Thus, it is troublesome to take a copy sheet from the copy tray. When the space between the copy tray and the scanner is widened to improve the copy visibility, the height of the apparatus is increased. In addition, the finger wedging risk mentioned above is not eliminated.

JP-A 2004-264500 discloses a cavity type image forming apparatus in which copy sheets are discharged to the copy tray from one of the side portions of the apparatus while the scanner can be slid from the front side to the rear side thereof and vice versa. Although an openable and closable window is provided on an upper support of the image forming section to improve the copy visibility, copy sheets on the tray cannot be accessed unless a hand is inserted from the side of the apparatus, and it is troublesome to take out the copy sheet. In addition, the operation panel of the apparatus which is provided on the upper unit extends toward the operator side, and therefore the copy visibility and the copy accessibility are not good. Further, the finger wedging risk mentioned above is not eliminated. Furthermore, there is a risk such that an operator sprains his or her fingers when taking copy sheets from the copy tray.

JP-A 10-290311 (i.e., Japanese patent No. 3477026) discloses an image forming apparatus which is not a cavity type image forming apparatus and in which a scanner unit located over the printer unit is slid in the left and right direction. The finger wedging risk mentioned above is not eliminated.

In addition, JP-A 10-63053 (i.e., Japanese patent No. 3446928) discloses an image forming apparatus, which is not a cavity type image forming apparatus and in which a scanner unit located over the printer unit is slid in the left and right direction. The apparatus includes rollers configured to slide the scanner, roller shafts configured to support the rollers, and grooves configured to guide the roller shafts, in order to slide the scanner.

JP-A 2004-354832 discloses a cavity type image forming apparatus in which a scanner located over the image forming section can be smoothly slid without widely changing the center of gravity of the image forming apparatus. The image forming apparatus has such configuration that the image forming section and the scanner are supported by bosses and rails provided on the frame of the scanner, and rail guides and bosses provided on the upper surface of the image forming section.

In the image forming apparatuses disclosed by JP-As 10-63053 and 2004-354832, the number of parts increases, resulting in increase of the manufacturing costs, and the height of the apparatuses tends to increase.

Because of these reasons, a need exists for a cavity type image forming apparatus which has good copy visibility and which hardly causes problems in that fingers of operators are wedged between the scanner and the image forming when the scanner is slid, and goods such as clips are mistakenly dropped into the sliding mechanism, thereby damaging the sliding mechanism and the image forming apparatus. In addition, a need exists for a cavity type image forming apparatus which does not cause a problem in that when a user transports the apparatus while grasping the upper unit thereof, the upper unit is separated from the lower unit (such as image forming section) or the upper unit is deformed.

SUMMARY OF THE INVENTION

As an aspect of the present invention, an image forming apparatus is provided which includes:

an image forming section configured to form an image on a sheet;

an upper unit which is located over the image forming section with a space therebetween and which is slid in a first direction of from the front side to the rear side of the image forming apparatus and a second direction of from the rear side to the front side thereof;

a sheet discharger configured to discharge the sheet bearing the image thereon into the space in the first or second direction;

a sheet stacker (copy tray) configured to receive the sheet from the sheet discharger to store the sheet thereon;

a support which is located outside of both side ends of the sheet stacker and extends in the first direction and which is configured to support the upper unit so that the upper unit is slid in the first and second directions; and a release preventing member configured to prevent releasing of the upper unit from the support.

Alternatively, an image forming apparatus is provided which includes:

an image forming section configured to form an image on a sheet;

an upper unit which is located over the image forming section with a space therebetween and which is slid in a first direction of from the front side to the rear side of the image forming apparatus and a second direction of from the rear side to the front side thereof;

a support configured to form the space and to support the upper unit so that the upper unit is slid in the first and second directions, wherein an opening is formed at an end portion of the support when the upper unit is slid; and a covering member which is moved from a first position to a second position in conjunction with sliding of the upper unit and which covers the opening when acquiring the first position.

The image forming apparatus can optionally include the sheet discharger and the sheet stacker mentioned above.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

An example of the image forming apparatus of the present invention will be explained by reference to FIGS. 1, 2 and 3.

Figure 1:
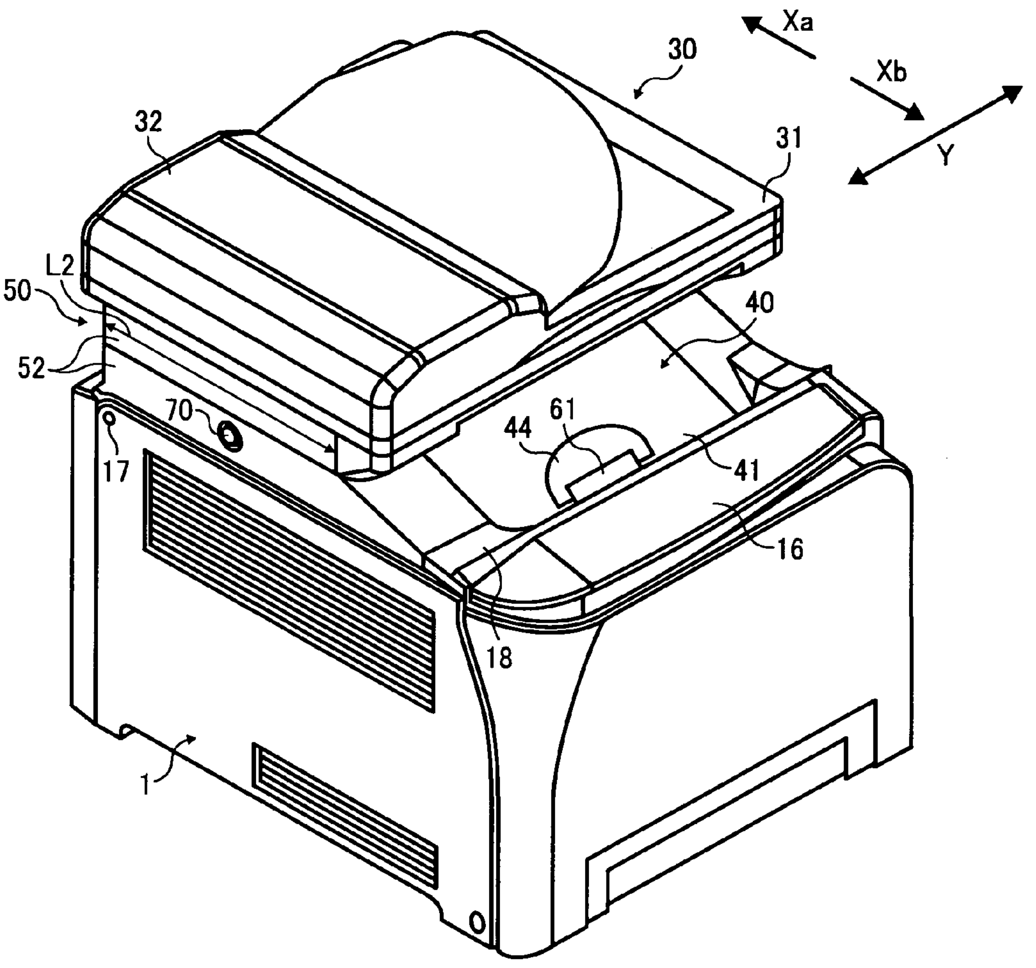
FIG. 1 is a schematic perspective view illustrating an example of the image forming apparatus of the present invention.
Figure 2:
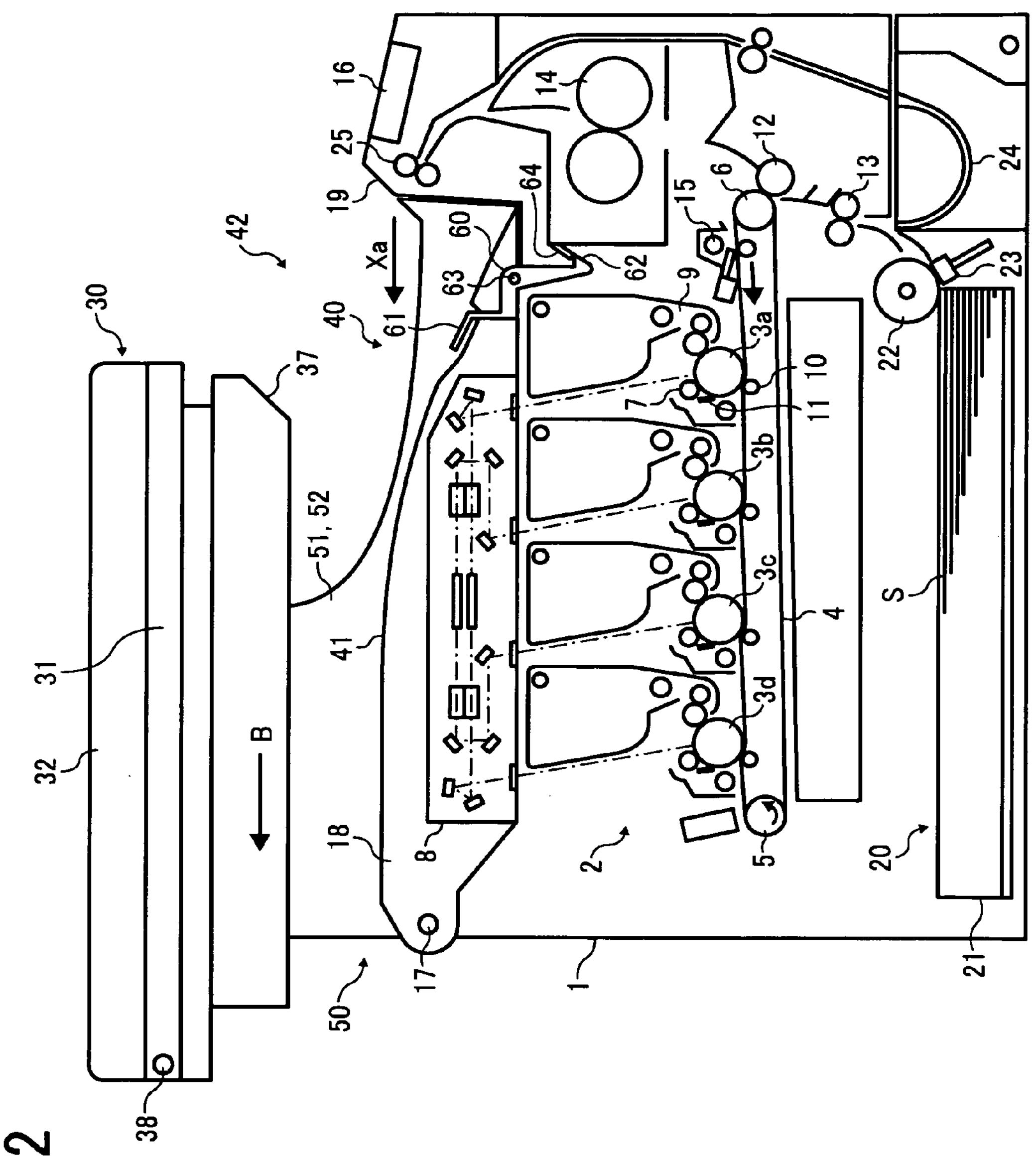
FIG. 2 is a schematic cross sectional view of the image forming apparatus illustrated in FIG. 1.

FIGS. 1 and 2 are schematic perspective view and cross sectional view of an example image forming apparatus, which is a tandem type color image forming apparatus having a scanner and a cavity type image forming apparatus. FIG. 3 is a cross sectional view of the example image forming apparatus in which the upper combination thereof is opened.

Figure 3:
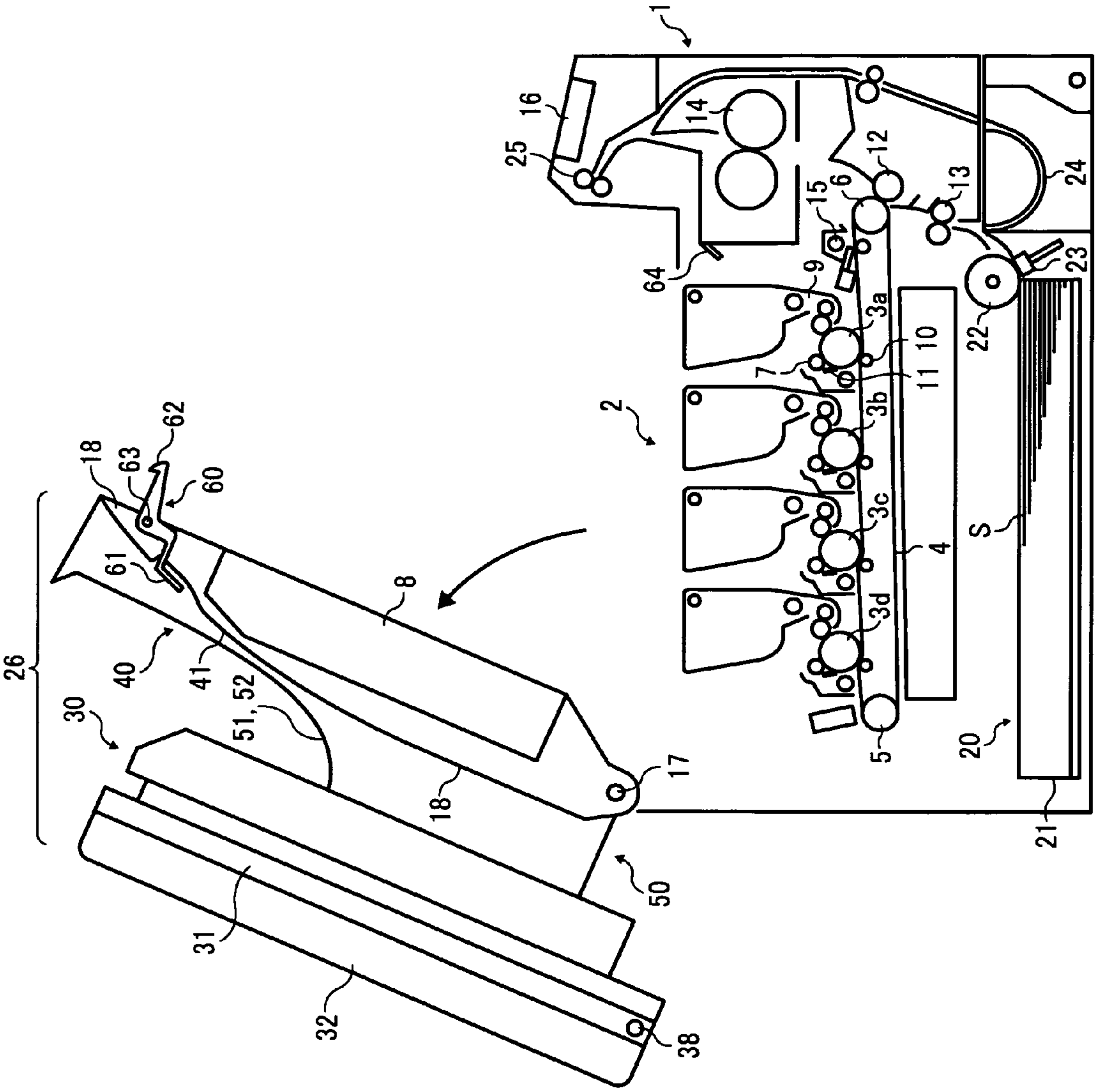
FIG. 3 is a schematic cross sectional view of the image forming apparatus illustrated in FIG. 1, in which the upper combination of the image forming apparatus is opened.

Referring to FIGS. 1-3, the image forming apparatus includes an image forming section 2, which is located at the center of the apparatus and which includes an image forming device (mentioned later) configured to form a visual image on a receiving sheet S (hereinafter referred to as a sheet); a sheet feeding section 20 which is located under the image forming section 2 and which is configured to feed the sheet S to the image forming section; an image reading device 30 (mentioned later, and hereinafter sometimes referred to as a scanner), which serves as an upper unit and which is located over the image forming section 2 with a space therebetween; a sheet discharger 25 configured to discharge the sheet S bearing an image thereon in a first direction (Xa) of from the front side (i.e., the side having a control panel 16) of the apparatus to the rear side thereof; a sheet stacker 40 (i.e., copy tray) configured to receive and store the sheet S thereon (i.e., in the space formed by the upper unit and the image forming section); and a support 50 configured to support the scanner 30 such that the scanner is slid back and forth in the first direction Xa and a second direction Xb.

Since copied sheets are stacked in the space formed between the image forming section 2 and the scanner 30, the image forming apparatus is a cavity type image forming apparatus.

Referring to FIG. 1, Y represents a direction, which is perpendicular to the sheet discharging direction (or the first scanner sliding direction) Xa and the second scanner sliding direction Xb and which is a sheet width direction.

The image forming section 2 includes four image forming devices including respective photoreceptor drums 3*a*, 3*b*, 3*c* and 3*d*, which serve as image bearing members and on which different color toner images (such as yellow, magenta, cyan and black toner images) are formed. The photoreceptors 3 are arranged at regular intervals so as to be parallel to each other. In addition, an intermediate transfer belt 4 serving as an intermediate transfer medium is provided so as to be opposed to the photoreceptor drums 3. In this example, the intermediate transfer belt 4 is an endless belt rotated while supported by support rollers 5 and 6. However, the intermediate transfer medium is not limited thereto, and a drum can be used therefor.

The four image forming devices have almost the same configuration, and therefore only the yellow image forming device, which is located at the right end position and which includes the photoreceptor drum 3*a*, will be explained in detail.

The yellow image forming device includes a charger 7 configured to uniformly charge the surface of the photoreceptor 3*a*. A light scanning unit 8 irradiates the charged photoreceptor 3*a* with imagewise light to form an electrostatic latent image on the photoreceptor 3*a*. The image forming device further includes a developing device 9 configured to develop the electrostatic latent image with a developer including a yellow toner to form a yellow toner image on the photoreceptor 3*a*; a transfer device 10, which is opposed to the photoreceptor 3*a* with the intermediate transfer belt 4 therebetween and which transfers the toner image to the intermediate transfer belt 4 from the photoreceptor 3*a*; and a cleaner 11 configured to remove toner particles remaining on the photoreceptor 3*a* even after the image transfer process.

Next, the image forming operation will be explained by reference to FIGS. 1 and 2.

At first, an image forming order is made, the photoreceptor 3*a* is clockwise rotated. In this case, the charger 7 charges the photoreceptor 3*a* so that the photoreceptor has a charge with a predetermined polarity. The light scanning unit 8 irradiates the charged photoreceptor with light including image information to form an electrostatic latent image on the photoreceptor 3*a*. The developing device 9 develops the electrostatic latent image with a developer including a yellow toner to form a yellow toner image on the photoreceptor 3*a*. The transfer device 10 transfers the toner image onto the intermediate transfer belt 4.

Similarly, magenta, cyan and black toner images are formed on the respective photoreceptors 3*b*, 3*c* and 3*d*. The thus formed four color toner images are sequentially transferred onto the intermediate transfer belt 4 to be overlaid, resulting in formation of a combined color toner image on the intermediate transfer belt 4.

On the other hand, the sheet feeding section 20 feeds the sheet S (such as sheets of paper and resin films) toward the image forming section 2. The sheet feeding section 20 includes a sheet tray 21 serving as a sheet container; a sheet feeding roller 22 configured to feed the sheets in the sheet tray; a friction pad 23 serving as a separator configured to separate plural sheets fed by the sheet feeding roller; a second passage 24 configured to feed the sheet S when an image is formed on the rear side of the sheet S to produce a double-sided copy.

The sheet S is further fed and stopped when the tip of the sheet hits a pair of registration rollers 13 to adjust the position of the tip of the sheet. Then the pair of registration rollers timely rotate to feed the sheet S toward a secondary transfer nip formed by a secondary transfer roller 12 and the intermediate transfer belt 4 supported by the support roller 6 so that the combined color toner image is transferred to a predetermined position of the sheet S at the secondary transfer nip. The sheet S bearing the combined color toner image thereon is then fed to a fixing device 14 at which the color toner image is fixed on the sheet upon application of heat and pressure. The sheet bearing the fixed color toner image thereon is then discharged to the sheet stacker 40 by the sheet discharger 25. Toner particles remaining on the intermediate transfer belt 4 even after the secondary image transfer operation are removed therefrom by a belt cleaner 15.

The scanner 30 is the same as those for general image forming apparatuses and has a function of scanning and reading images of an original document set on the scanner and pressed by a platen cover 31. The platen cover 31 is provided on the main body of the scanner 30 so as to be opened and closed by a hinge 38. The platen cover 31 includes an automatic document feeder 32, which automatically feeds original document sheets to the scanner 30. An original document sheet can be manually set on the scanner to be read. The scanner 30 is supported by the support 50, which is explained later in detail.

The control panel 16 controls operations of the scanner 30 and the image forming section 2. In this regard, the control panel side of the image forming apparatus is the front side thereof. Thus, the sheet discharger 25 is arranged on the front side of the image forming apparatus. Therefore, copy sheets are discharged from the front side to the rear side of the image forming apparatus. Thus, the image forming apparatus is a front-discharge type image forming apparatus.

An upper cover 18 is provided on a main body 1 of the image forming apparatus to cover the image forming section 2 and to serve as a frame member. The upper cover 18 also serves as a sheet bearing surface 41 of the sheet stacker 40. The support 50 is provided on the upper cover 18. In this example of the image forming apparatus, the support 50 is arranged along both the side ends of the upper cover 18 while extending in the direction Xa to support the scanner 30 so that the scanner can be slid in the directions Xa and Xb, and therefore a space is formed between the sheet stacker 40 and the scanner 30. Namely, the support 50 includes a first support 51 and a second support 52. In this regard, there is no support on the rear end portion of the upper cover 18. Therefore, a sheet longer than the length of the sheet bearing surface 41 in the direction Xa (or Xb) can be stacked on the sheet bearing surface 41 while the front end portion of the sheet extends beyond the sheet bearing surface or droops from the rear end of the sheet bearing surface. In addition, light irradiates the sheet bearing surface 41 from the rear end thereof, the copy sheets thereon can be well observed from the front side of the image forming apparatus.

As illustrated in FIGS. 2 and 3, the upper cover 18 supports the light scanning unit 8, which is part of the image forming section 2, and the light scanning unit 8 can be swung and opened by being hinged together with the support 50 and the upper unit 30. The upper cover 18 is locked onto the main body 1 with a lock lever 60 serving as a locking device. By unlocking the lock lever 60, the upper cover 18 can be opened. When the upper cover 18 is opened as illustrated in FIG. 3, an upper combination 26 (i.e., combination of the scanner (upper unit) 30 and the light scanning unit 8 with the first and second supports 51 and 52) is swung and opened, and thereby the image forming devices can be accessed. Therefore, the maintenance operation of the image forming devices can be easily performed. In this example, four process cartridges including a photoreceptor, a charger, a developing device and a cleaner are used as the image forming devices. The image forming devices (i.e., process cartridges) can be easily replaced by opening the upper combination 26.

When opened, the upper cover 18 is swung such that the rear side of the sheet bearing surface 41 is on a lower level than the level of the front side thereof. In this case, when copy sheets are present on the sheet bearing surface 41, a problem in that the sheets drop from the copy stacker 40 to the backside of the image forming apparatus occurs. By providing a projection or the like on the rear side of the sheet bearing surface 41, the problem can be avoided. However, in this case, another problem in that long copy sheets hit the projection, and the copy sheets cannot be well stacked occurs.

In order to avoid the sheet dropping problem, an operation member 61 of the lock lever 60 is located at such a position that the operation member 61 is covered with a copy sheet on the sheet bearing surface 41. Therefore, when a copy sheet is present on the sheet bearing surface 41, the member 61 cannot be operated, and thereby the upper combination 26 cannot be opened, resulting in prevention of the sheet dropping problem. The lock lever 60 has the operation member 61, and a pick 62 which is integrated with the operation member 61 and which is to be engaged with a projection 64 formed on a location of the main body 1. The lock lever 60 is pivoted around a pin 63 fixed to the upper cover 18 while pressed with a coil spring (not shown, provided on the pin 63) in such a direction that the pick 62 is engaged with the projection 64. The operation member 61 has a plate form and is set so as to be on the same level as that of the sheet bearing surface 41. As illustrated in FIG. 1, a recessed portion 44 having a sector form is formed on the sheet bearing surface 41 so that the operation member 61 can be easily accessed When the upper cover 18 is opened, a hand is inserted from the recessed portion 44 to pull up the operation member 61 of the lock lever 60 while resisting the bias force of the coil spring, thereby clockwise pivoting the lock lever 60 around the pin 63, resulting in release of the pick 62 from the projection 64. By further pulling up the operation member 61, the upper cover 18 is swung in the direction indicated by an arrow in FIG. 3 around a hinge 17 together with the automatic document feeder 32.

Since the operation member 61 of the lock lever 60 is located on the same level as the sheet bearing surface 41, the problem in that the upper cover 18 is opened while a copy sheet is present on the sheet bearing surface 41 can be avoided.

As mentioned above, image forming apparatuses having configuration such that a scanner is arranged over a sheet stacker have poor copy visibility and sheet-pick-up operability. The example image forming apparatus illustrated in FIGS. 1 and 2, has a wide space (opening) 42 on the front side thereof so that the sheet stacker 40 can be easily accessed and copy sheets thereon can be easily picked up. In this regard, the width of the space is wider than that of the copy sheets. In addition, the scanner 30 can be slid in a direction B (in FIG. 2) parallel to the direction Xa, and thereby the space 42 can be further widened.

In order to further improve the copy visibility and sheet-pick-up operability, the scanner 30 has a first tapered portion 37 at a front lower end thereof, and the main body 1 has a second tapered portion 19 near the control panel 16 as illustrated in FIG. 2, resulting in widening of the area of the opening 42. Therefore, a hand can be easily inserted from the opening 42. The method for widening the area of the opening 42 is not limited to formation of such tapered portions, and any other methods can be used.

Next, the method for picking up a copy sheet will be explained.

Figure 4:
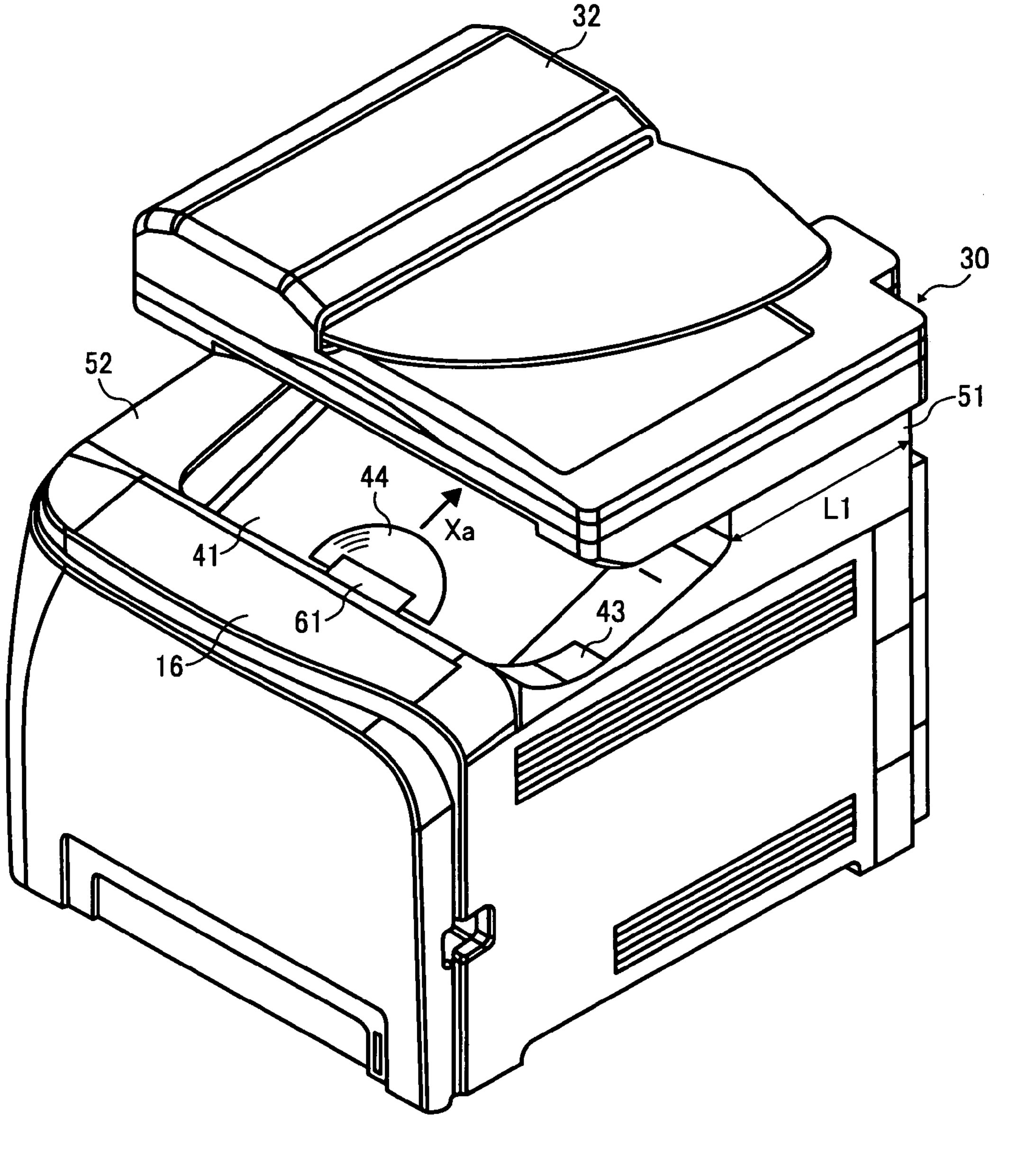
FIG. 4 is another schematic perspective view of the image forming apparatus illustrated in FIG. 1 when the apparatus is observed from an upper right side.
Figure 5:
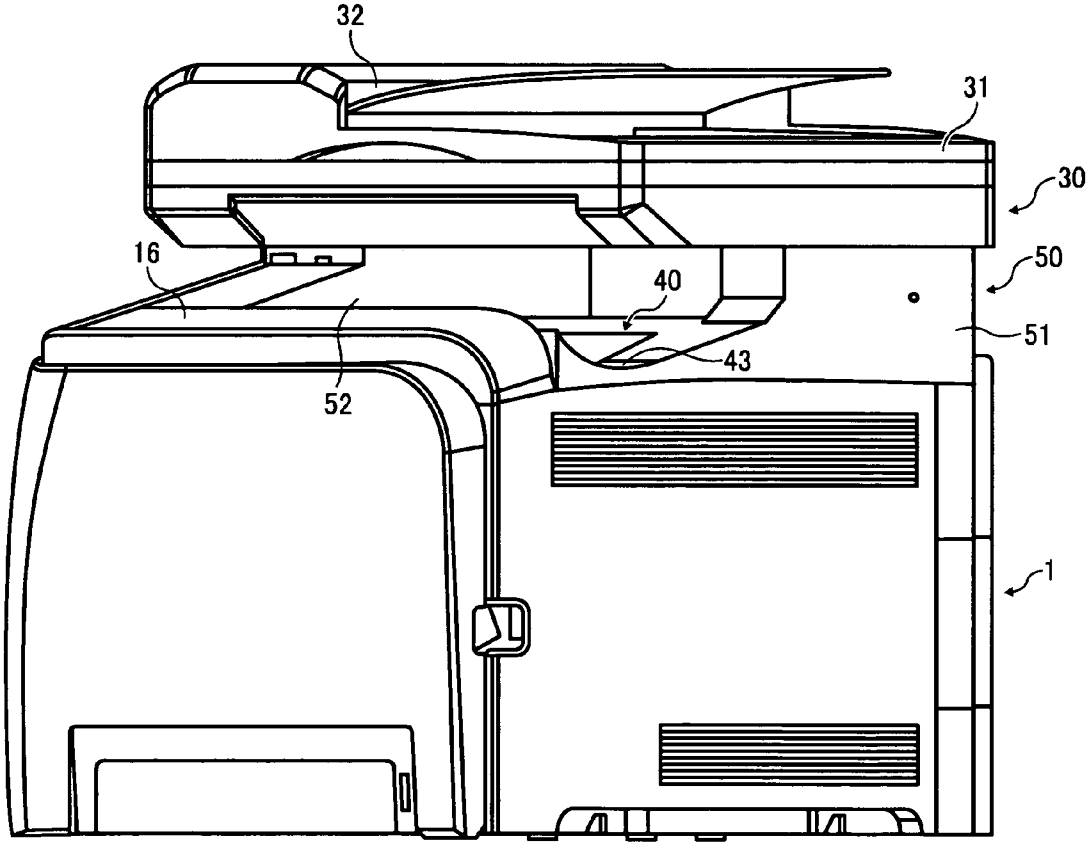
FIG. 5 is a schematic side view of the image forming apparatus illustrated in FIG. 1 when the apparatus is observed from a right side.

FIGS. 4 and 5 are schematic views illustrating the image forming apparatus illustrated in FIG. 1 when the apparatus is observed from different angles. As illustrated in FIGS. 4 and 5, a recessed portion 43 having a surface lower than the sheet bearing surface 41 is formed on the right side of the sheet stacker 40 so that the sheet bearing surface can be easily accessed. The right side of the sheet stacker 40 is slanted upwardly in the direction Xa. Therefore, copy sheets on the sheet bearing surface 41 can be easily picked up not only from the front opening 42 but also from the right side (i.e., the recessed portion 43). Needless to say, a recessed portion can be provided on the left side of the sheet stacker instead of the right recessed portion 43.

The support 50 includes right and left supports 51 and 52. In this example, the right and left supports are integrated, and therefore they are sometimes referred to as the support 51/52.

Figure 6:
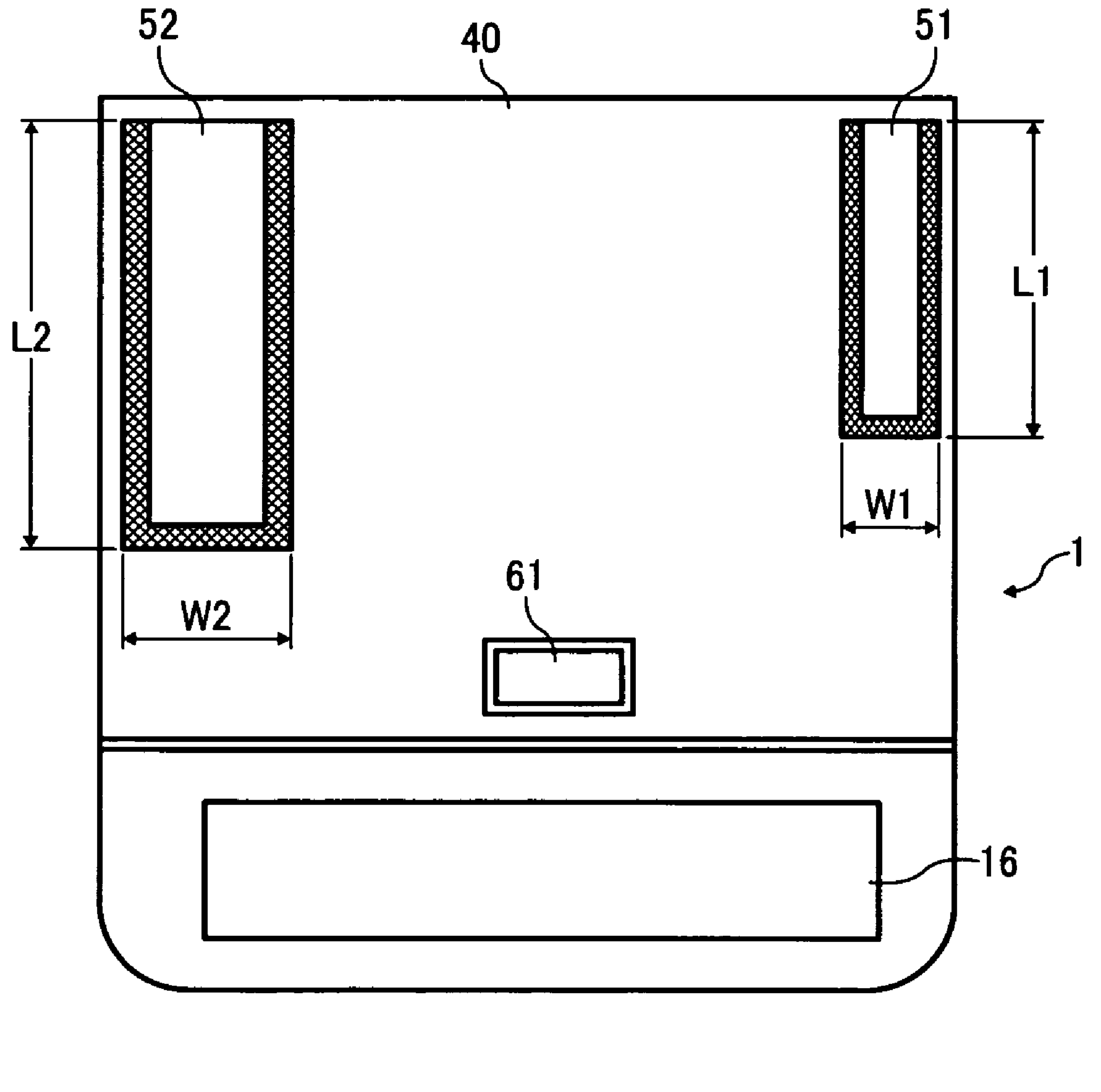
FIG. 6 is a schematic plan view illustrating the right and left supports of the image forming apparatus.

As illustrated in FIGS. 5 and 6, the right support 51 has a length (L1) in the direction Xa shorter than a (L2) of the left support 52 because the recessed portion 43 is formed on the right support 51. By forming the recessed portion 43, not only the copy-pick-up operability but also the copy visibility can be further enhanced because light irradiates the sheet bearing surface 41 from the right side of the main body 1. In this regard, since the left side of the scanner has a relatively heavy weight compared to the right side thereof, the length (L2) of the left support 52 is set so as to be longer than that (L1) of the right support 51. Therefore, a problem in that the scanner cannot be well supported by the support 51/52 is not caused.

As mentioned above, the recessed portion 44 is formed on the sheet bearing surface 41 so as to be close to the operation member 61 of the lock lever 60. By widening the width of the recessed portion 44 so as to be longer than the width of copy sheets, the copy sheets on the sheet bearing surface 41 can be easily picked up from the recessed portion 44. In this regard, the copy sheets are discharged at the center of the sheet bearing surface 41.

Next, the lock lever 60 will be explained in detail. The operation member 61 of the lock lever is slantingly arranged and the surface thereof is not higher in level than the sheet bearing surface 41. Therefore, a problem in that copy sheets are badly stacked on the sheet bearing surface 41 because the sheets discharged from the discharger 25 are stopped by the operation member 61 after the rear sides of the sheets are slid down along the sheet bearing surface 41 can be avoided. The position of the operation member 61 is not limited thereto. It is preferable that the operation member 61 is provided on a downstream side from the point of the sheet bearing surface 41, with which the rear sides of copy sheets are contacted when the copy sheets are just discharged, relative to the direction Xa. In another example where a copy sheet is dropped down from the discharger by its own weight, the operation member 61 may be provided near the discharger 25.

It is clear from FIGS. 1 and 4 that the operation member 61 can be well observed from the front side of the image forming apparatus because the front side of the scanner 30 is located on a slanted surface of the copy bearing surface and on a relatively rear side of the apparatus compared to the operation member 61. Therefore, when copy sheets on the sheet bearing surface 41 are picked up from the opening 42, the operation member 61 can be well observed from the front side of the apparatus.

The scanner 30 is arranged such that the sub-scanning direction (i.e., the original document feeding direction) of the scanner is perpendicular to the sheet discharging direction Xa. As illustrated in FIG. 2, the front side of the main body 1 extends from the scanner and the support 50 in the direction Xb, and the control panel 16 is provided on the upper front portion of the main body 1. Therefore, the opening 42 can have a wide area. Accordingly, copy sheets can be well observed even when the copy sheets have a short length, and the operation member 61 of the lock lever 60 can be well observed from an upper side.

The support 50 and the scanner 30 will be further explained with reference to the strength and shock absorbing property thereof using FIGS. 6-9. As illustrated in FIGS. 6-9, the scanner 30 having the automatic document feeder (ADF) 32 has configuration such that a movable optical module 130 thereof faces the left support 52, and the original document turning portion of the ADF 32 is located on the left side of the scanner 30 (i.e., the right sides of the original document setting tray and the original document discharging tray of the ADF 32 are opened as illustrated in FIGS. 1 and 4).

Figure 8:
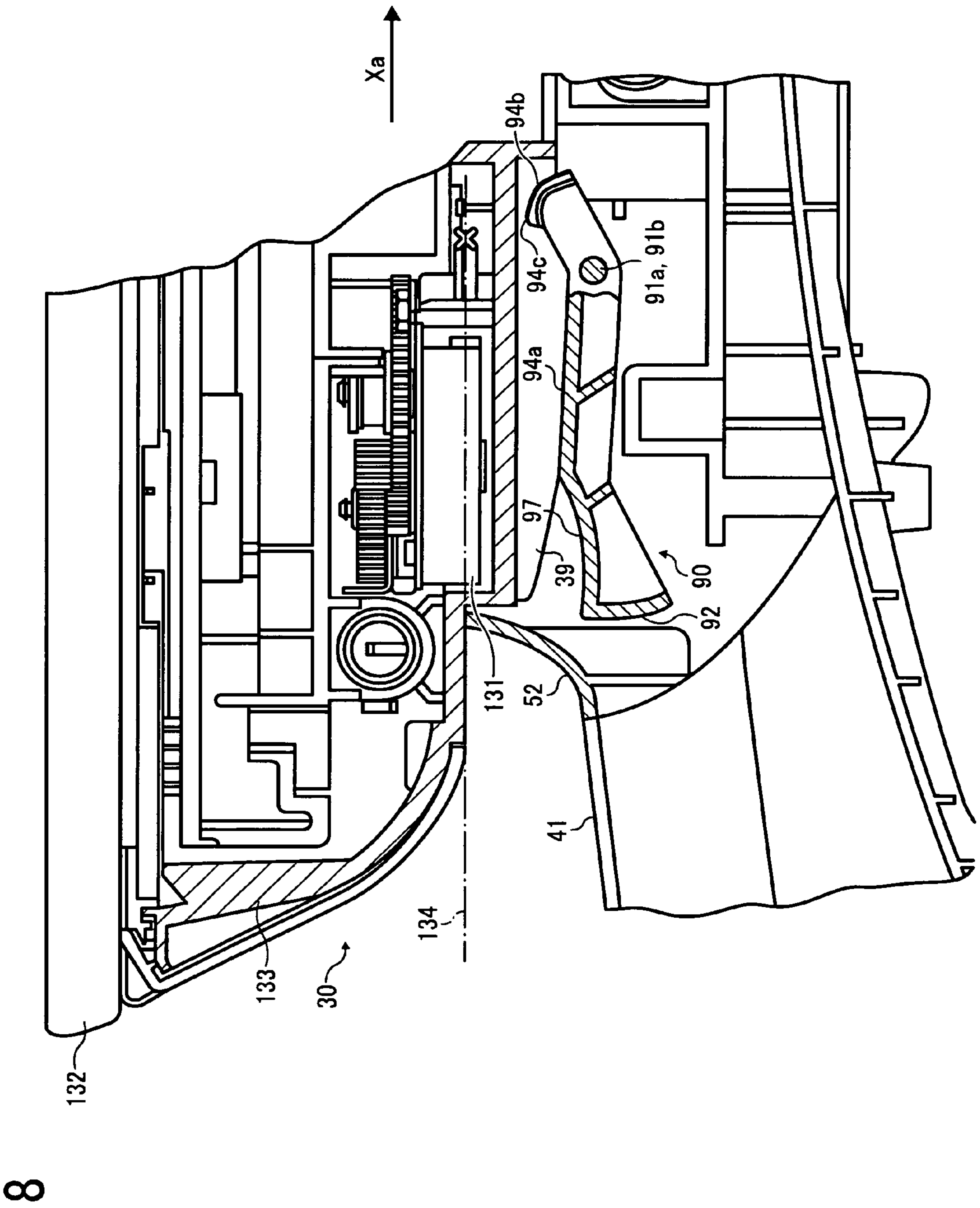
FIG. 8 is a schematic cross sectional view illustrating the scanner which is located at the forefront and which is engaged with the covering member.
Figure 9:
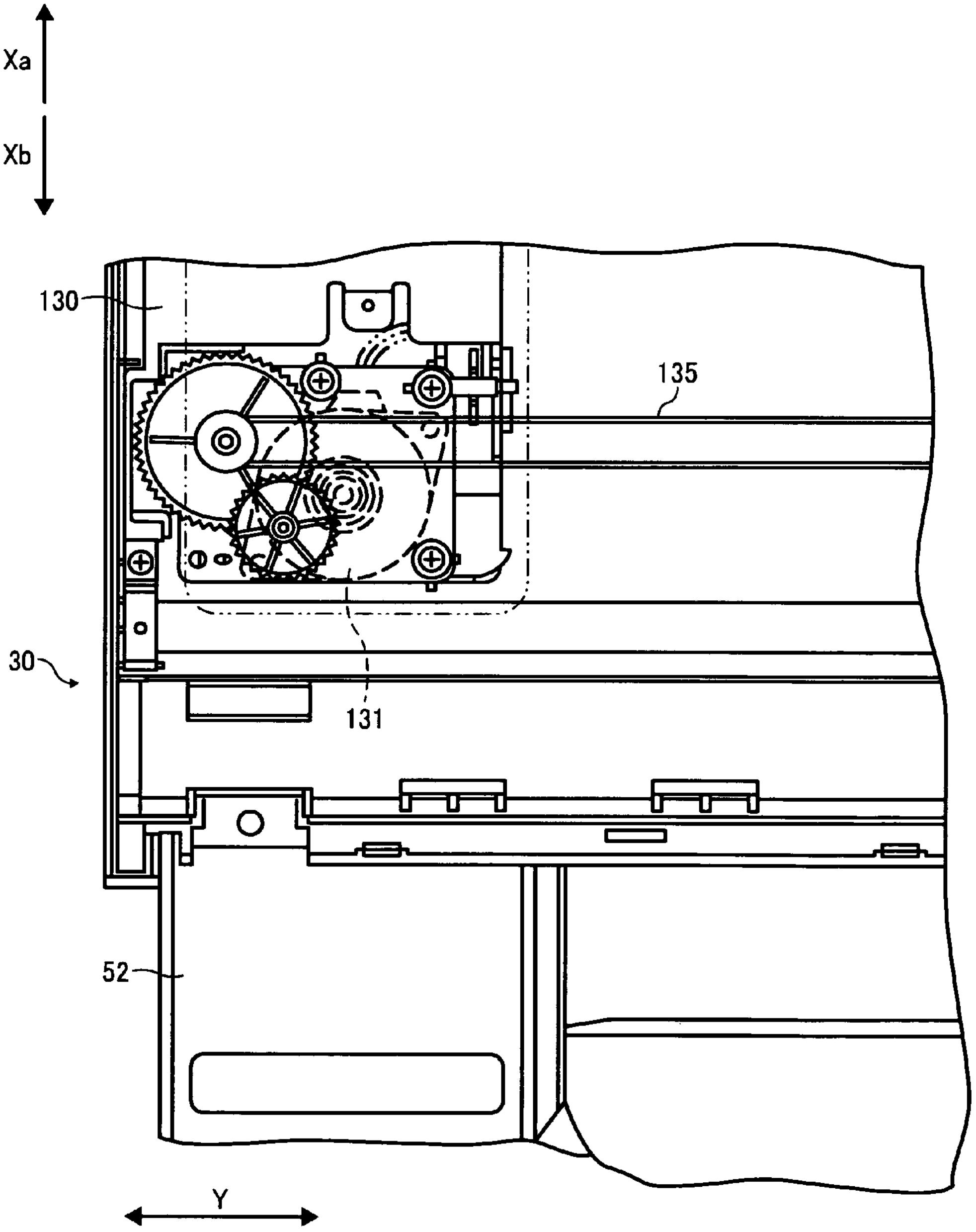
FIG. 9 is a schematic cross sectional view illustrating the driving motor of the scanner when the scanner is located at the forefront.

The right support 52 is smaller (shorter) than the left support 51. This is because the optical module 130, which has a scanning unit and a carriage, is located on the left side of the scanner 30, thereby shifting the weight of the scanner to the left side thereof, and copy sheets on the sheet bearing surface 41 can be easily picked up by operators. Namely, since the load of the scanner 30 on the right support 51 is light, the front portion of the right support 51 is cut. The reason why the apparatus has this configuration is that right-handed persons constitute the majority of the operators. In addition, another reason is that a driving motor 131 and a drive transmitter such as gears, which serve as a driving device of the scanner 30, are provided on the left side of the scanner 30 as illustrated in FIGS. 8 and 9. The scanner 30 includes a scanning unit (not shown) for reading the image of an original document; and the driving unit 131 for driving the scanning unit using a timing belt or the like.

Referring to FIGS. 8 and 9, numeral 132 denotes an openable/closable upper cover of the scanner 30, numeral 133 denotes a case of the scanner, and numeral 134 (i.e., a chain line in FIG. 8) denotes an outline of the bottom of the case 133 except for a projected portion of the scanner due to the motor 131. The driving motor 131 is arranged so as to extend from the bottom 134 of the case 133 through an opening 59 (illustrated in FIG. 12). In order that the left support 52 can bear a heavy load, the length (L2) and a width W2 of the left support 52 are longer than those (L1 and W1) of the right support 51, respectively as illustrated in FIG. 6.

Figure 7:
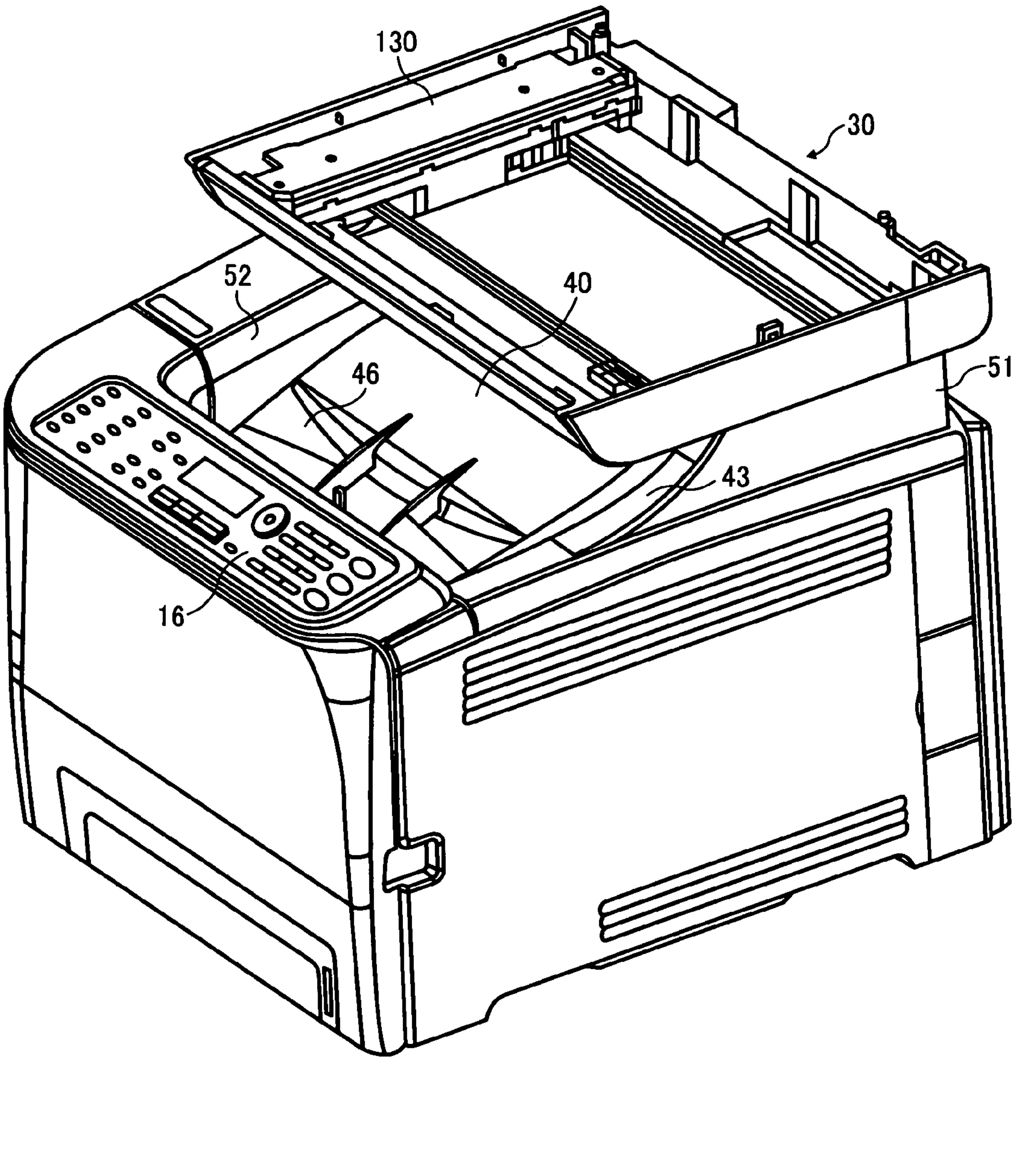
FIG. 7 is a schematic perspective view illustrating the inside of the scanner of the image forming apparatus.

Since the support has this configuration, the apparatus has good copy-pick-up operability. As illustrated in FIG. 7, a groove 46 can be formed on the sheet stacker 40 to improve the copy-pick-up operability. Further, one or more ribs can be formed on the groove 46 to improve the copy-pick-up operability.

Figure 10:
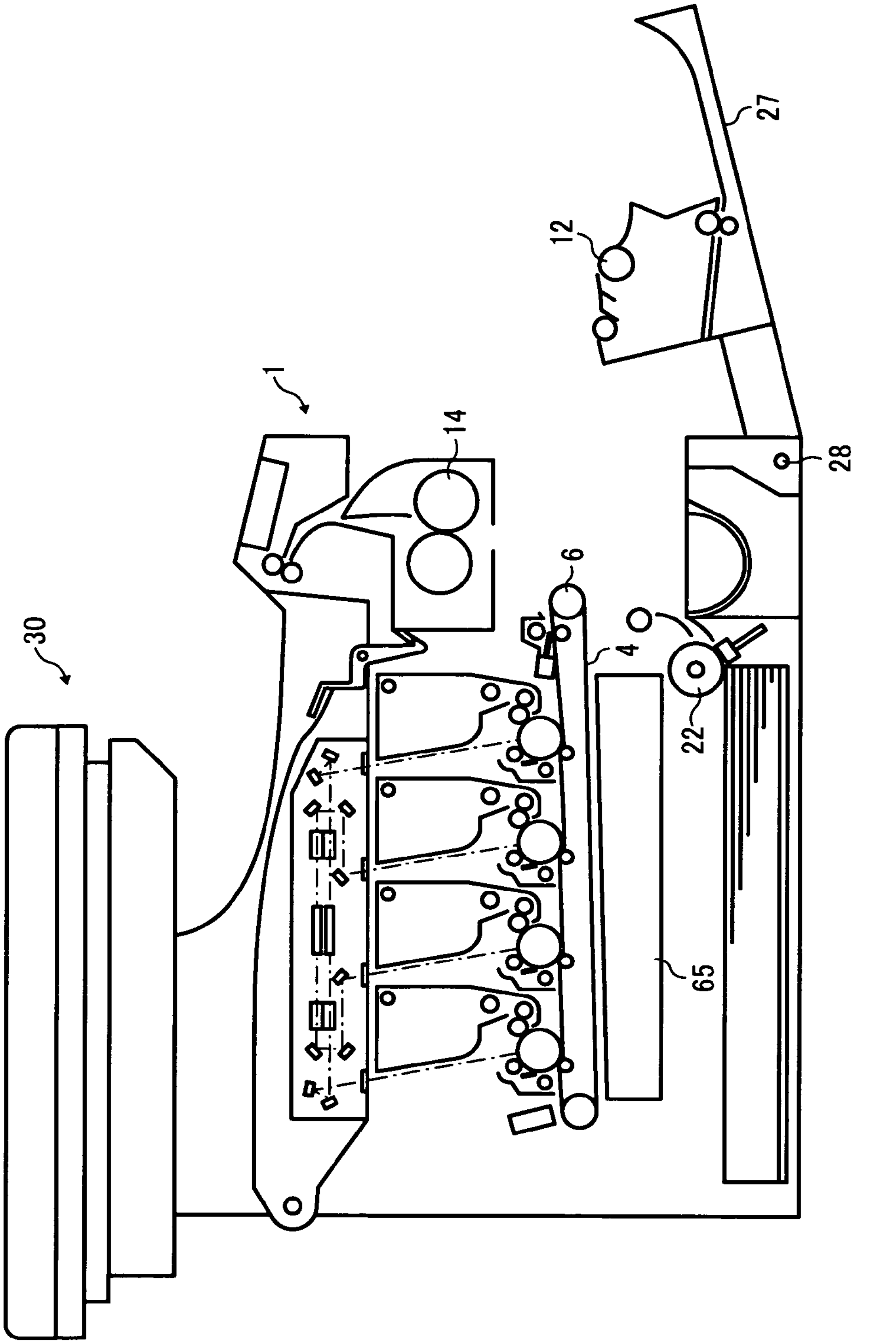
FIG. 10 is a schematic cross sectional view illustrating an example of the image forming apparatus in which the front cover can be opened and closed.

Referring to FIG. 10, the main body 1 has a front cover 27 which can be pivoted around a hinge 28 to be opened and closed. By opening the front cover 27, the unit including the intermediate transfer belt 4, a toner bottle 65 containing waste toner particles, the fixing device 14, etc., can be replaced with new ones. In addition, sheets jammed on the passage in the main body 1 can be removed therefrom.

Figure 11:
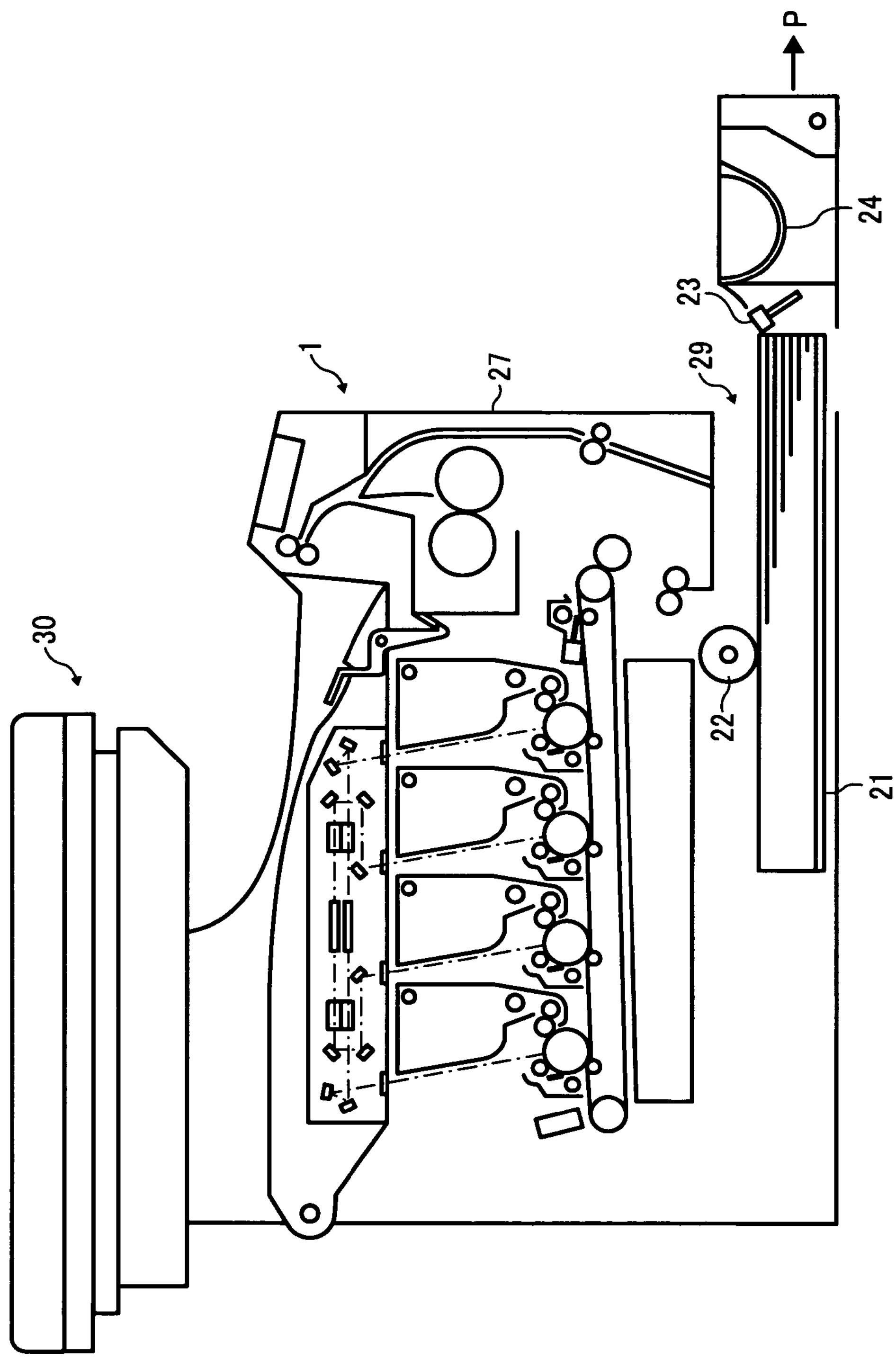
FIG. 11 is a schematic cross sectional view illustrating another example of the image forming apparatus in which the front cover can be detachably attached to the apparatus.

As illustrated in FIG. 11, the front cover 27 of the main body 1 has an opening 29 through which the sheet tray 21 can be detached from and attached to the main body 1. FIG. 11 illustrates the image forming apparatus in which the feeding tray 21, friction pad 23 and the second passage 24 are released from the main body 1 in a direction P. By performing this operation, the maintenance operation, replenishment and replacement of supplies such as receiving sheets, and removal of jammed sheets can be easily performed from the front side of the image forming apparatus, namely these operations need not be performed from the rear side thereof. Therefore, the image forming apparatus has low costs and good operability while saving the space.

Next, the sliding mechanism of the scanner 30 on the support 50, and the locking mechanism for the scanner will be explained.

As mentioned above by reference to FIGS. 1 and 2, a wide space (i.e., the opening 42) is formed between the scanner 30 and the main body 1 of the image forming apparatus. Therefore, the apparatus has good combination of copy-pick-up operability and copy visibility.

When it is desired to shorten the depth (i.e., the length in the directions Xa and Xb) of the apparatus and to lower the height of the apparatus, the size of the opening 42 has to be reduced. In this case, problems such that it is hard to insert a hand to pick up the copy sheets on the sheet bearing surface 41, and the tips of the copy sheets discharged by the discharger 25 hit the scanner 30, etc., thereby deteriorating the stacking property of the copy sheets occur. Specifically, as illustrated in FIG. 2, the scanner 30 extends from the main body 1 at the rear side of the apparatus. When it is desired to shorten the depth of the apparatus, the rear end of the scanner has to be set on the same plane as the rear end of the main body. In this case, the size of the opening 42 has to be reduced. Whether the size of an apparatus is more important than the copy-pick-up operability (i.e., the size of the opening 42) or vice versa depends on the users of the apparatus, and therefore it is preferable that the size of the opening 42 can be adjustable at several levels to satisfy the users.

Next, the supports 51 and 52 which has a sliding mechanism to slidably support the scanner 30 in the directions Xa and Xb will be explained in detail by reference to FIGS. 12-14.

Figure 12:
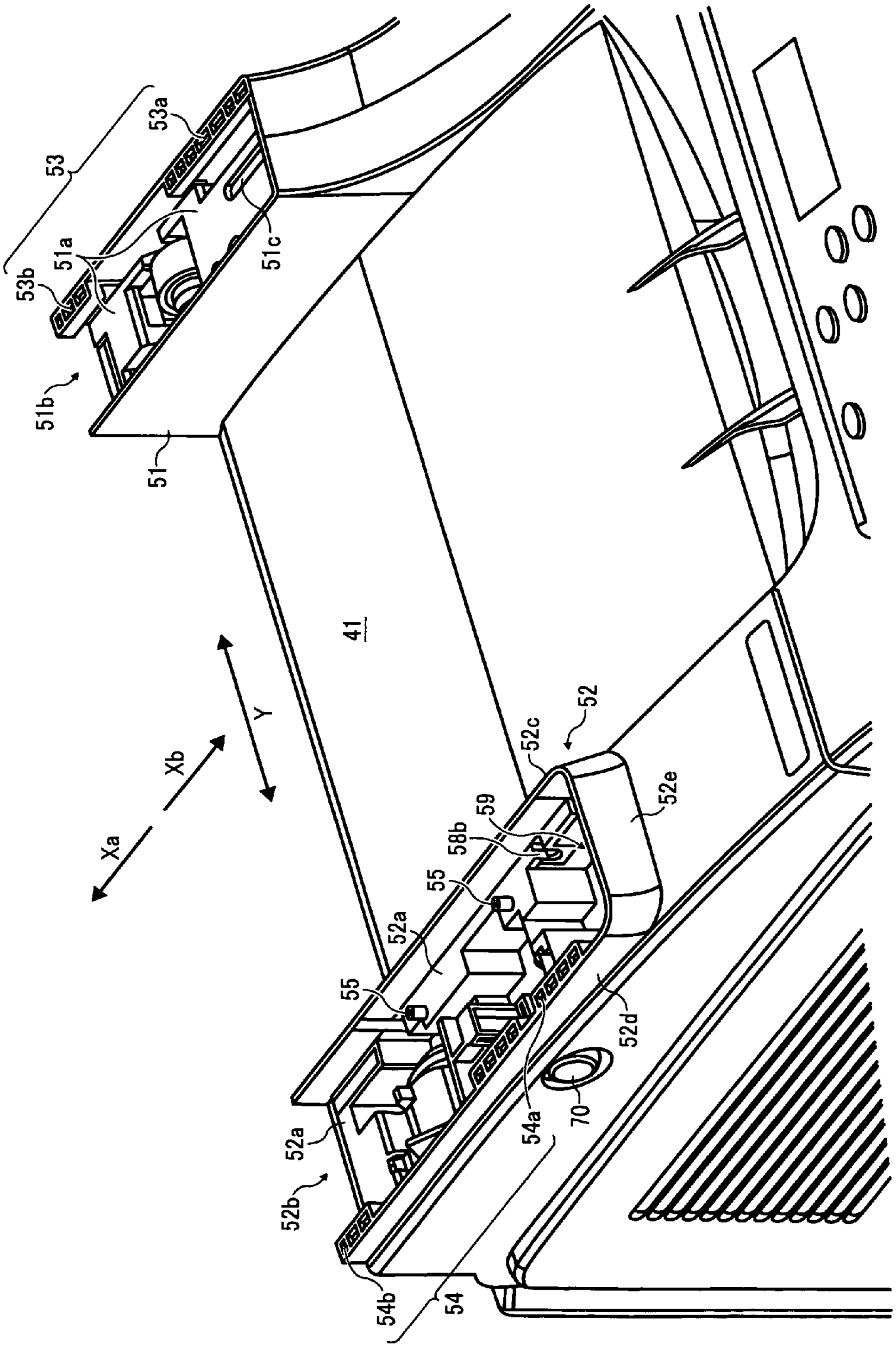
FIG. 12 is a schematic perspective view illustrating the right and left supports and the release preventing member of the image forming apparatus.
Figure 13:
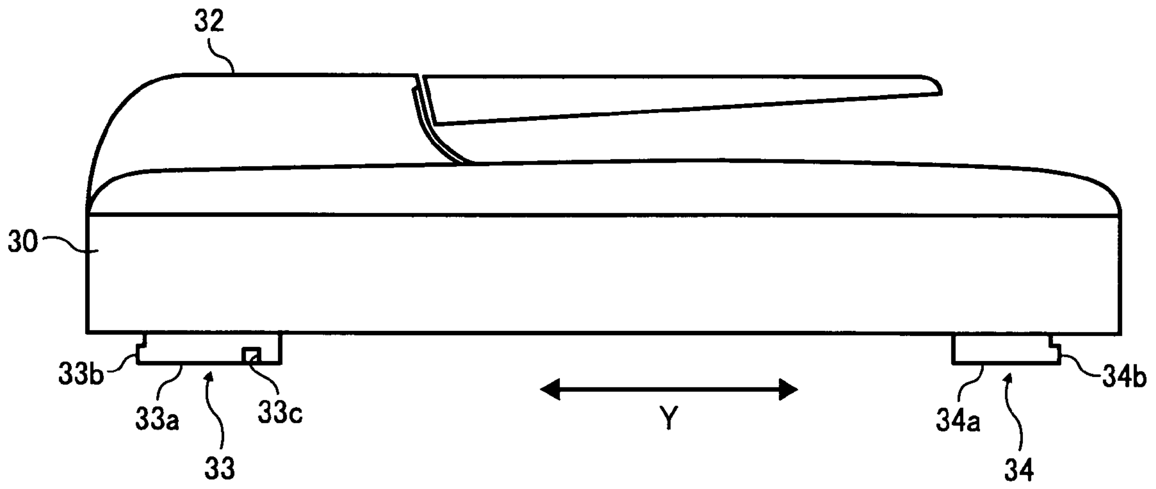
FIG. 13 is a schematic elevational view illustrating the scanner from the front side of the image forming apparatus.
Figure 14:
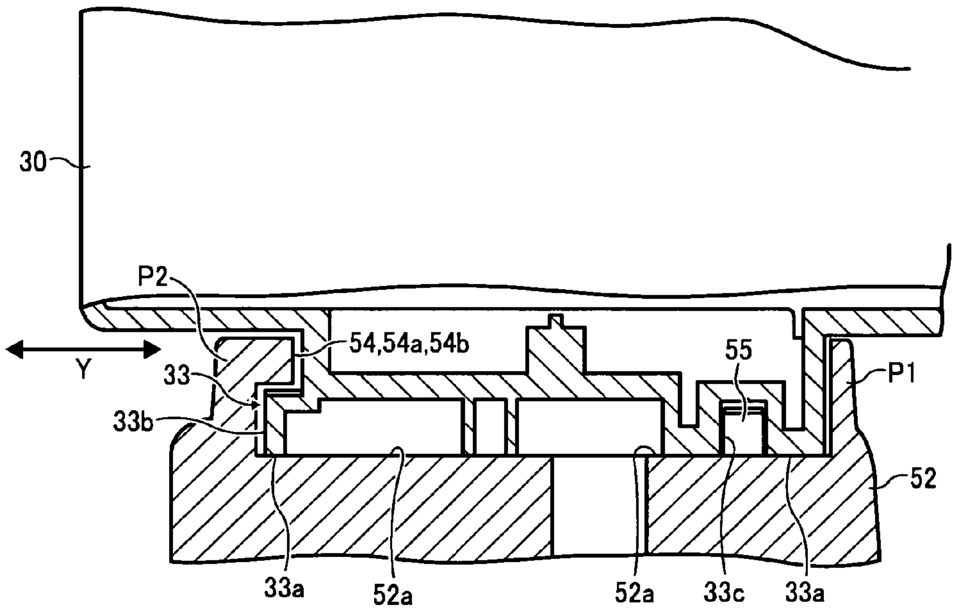
FIG. 14 is a schematic cross sectional view illustrating the rail of the scanner engaged with the left release preventing member.

As illustrated in FIGS. 13 and 14, rails 33 and 34 serving as sliding portions are integrally provided on the left and right sides of the scanner 30. The rails 33 and 34 respectively have bottom surfaces 33*a* and 34*a*, and projections 33*b* and 34*b*, which are integrated with the respective rails. In addition, the left rail 33 has a groove 33*c* extending in the directions Xa and Xb. Referring to FIGS. 12-14, the scanner 30 is slid such that the bottom surface 33*a* and 34*a* are slid on upper surfaces 51*a* and 52*a* of the supports 51 and 52, respectively. In addition, two pins 55 projecting from the support 52 are engaged with the groove 33*c* of the rail 33 with a predetermined space therebetween (as illustrated in FIG. 14) to control the backlash of the scanner in the horizontal direction. In addition, each of the supports 51 and 52 has a pair of walls (e.g., walls P1 and P2 for the support 52 as illustrated in FIG. 14), which are integrated with the upper surfaces 51*a* and 52*a*, respectively and which extend upward so that the rails 33 and 34 are sandwiched by the respective pair of walls (i.e., the pair of walls P1 and P2 sandwich the rail 33). Further, as illustrated in FIGS. 12 and 14, one of the walls has a projection 53 or 54 (the wall P2 has a projection 54 as illustrated in FIG. 14) extending toward the other wall (i.e., the wall P1 in FIG. 14) to prevent the scanner 30 from being released from the supports 51 and 52. Since the projections 53 and 54 are engaged with the projections 33*b* and 34*b*, respectively, with a predetermined space therebetween, problems in that the scanner 30 moves upward (i.e., backlash of the scanner in the vertical direction) or is released from the support can be avoided. Thus, the projections 53 and 54 serve as release preventing members.

FIG. 14 illustrates that the left support 52 is engaged with the left rail 33 of the scanner 30. Similarly to the left support 52 and the left rail 33, the right support 51 is also engaged with the right rail 34 (not shown) except that the positions of the projections 53 and 54 are different from each other as illustrated in FIG. 12. Needless to say, projections such as the projections 53 and 54 may be formed on the opposite walls, (for example, the projection 54 maybe formed on the other wall P1 in FIG. 14) while projections are formed on the respective rails 33 and 34, to avoid the problems in that the scanner 30 moves upward (i.e., backlash of the scanner in the vertical direction) or is released from the support.

The function of the release preventing member is as follows. The release preventing member is provided in the support to prevent at least releasing of the upper unit from the support. Specifically, the release preventing member prevents not only occurrence of a problem in that when a user transports the apparatus while grasping the upper unit, the upper unit is released from the support or image forming section, but also occurrence of a problem in that parts constituting the apparatus are damaged due to deformation of the upper unit caused by the force applied by the user to the upper unit. Namely, the release preventing member imparts good strength reliability to the apparatus. Such strength reliability is hardly considered for conventional image forming apparatuses.

Thus, the bottom surfaces 33*a* and 34*a* of the rails 33 and 34 integrated with the scanner 30 are slid on the upper surfaces 52*a* and 51*a* of the supports 52 and 51, respectively. Therefore, the scanner can be stably slid with a low-cost sliding mechanism using a small number of parts. In this regard, it is preferable to adjust the shapes of the rails 33 and 34 and the projections 53 and 54 so that the rails and projections can securely support the scanner 30 when the upper combination 26 is opened.

Since the projections 53 and 54 are integrated with the supports 51 and 52, respectively, the problems in that the scanner 30 moves upward (i.e., backlash of the scanner in the vertical direction) or is released from the support can be avoided using a simple and low-cost mechanism. In addition, since the load of the scanner 30 is received by both the projections 53 and 54, the scanner can be securely supported by the supports 51 and 52. Further, even when a force is applied to one of the left and right sides of the scanner 30, the problem in that the scanner 30 moves upward or is released from the support can be avoided. Needless to say, a reverse mechanism in which projections similar to the projections 53 and 54 may be formed on the rails 34 and 33 while sliding surfaces similar to those of the rails 33 are formed on the supports 51 and 52 can also be available.

When projections such as the projections 53 and 54 are formed on both sides (e.g., on the walls P1 and P2 in FIG. 14) in each of the supports 51 and 52, problems in that the rails 33 and 34 have small spaces for other parts and access to the parts provided in the supports 51 and 52 deteriorates. Specifically, cables, which are used for transmitting image signals from the scanner 30 to the controller arranged in the main body 1; a locking mechanism, which locks the ADF 32 and the platen cover 31 even when the upper combination 26 is opened; etc., are arranged in the rails 33 and 34. In addition, parts such as shock absorbers for the upper cover are arranged in the supports 51 and 52. Therefore, the release preventing members (e.g., the projections 53 and 54) preferably have a small space. In this example of the image forming apparatus of the present invention, the release preventing members (e.g., the projections 53 and 54) are provided on one side (the outside or inside) of the supports 51 and 52 as illustrated in FIG. 12. Therefore, the problems in that the scanner 30 moves upward (i.e., backlash of the scanner in the vertical direction) or is released from the support can be avoided using a simple, space-saving and low-cost mechanism.

As illustrated in FIG. 14, the projections 53 and 54 include respective front portions 53*a* and 54*a* and respective rear portions 53*b* and 54*b*. When a force is applied to the front side of the scanner 30, the front portions 53*a* and 54*a* receive the force. In addition, when a force is applied to the rear side thereof, the rear portions 53*b* and 54*b* receive the force. Therefore, occurrence of the problem in that the scanner 30 moves upward can be securely prevented. It this regard, other parts can be arranged in the spaces formed between the front portions 53*a* and 54*a* and the rear portions 53*b* and 54*b*. Although the projections 53 and 54 are separated into the front and rear portions 53*a* and 53*b* or 54*a* and 54*b* to save spaces, each of the projections 53 and 54 may be constituted of one portion.

Figure 15:
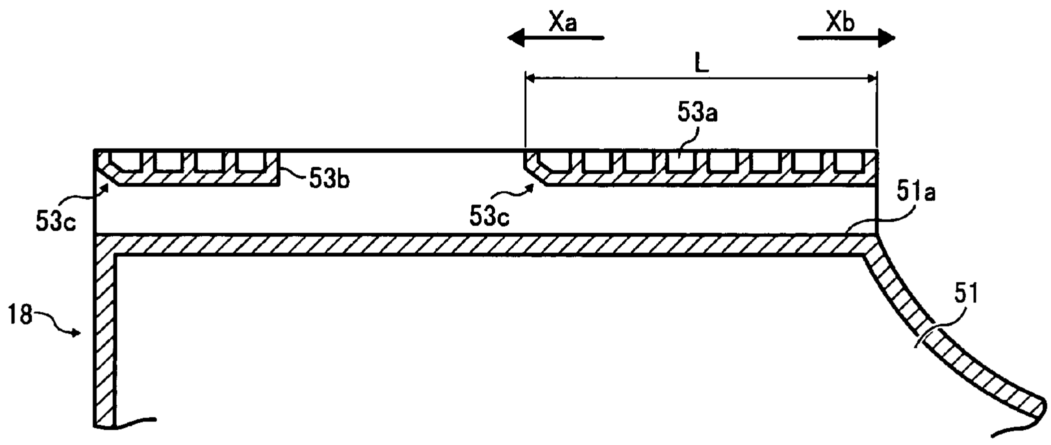
FIG. 15 is a schematic view illustrating the right release preventing member provided in the right support.
Figure 20:
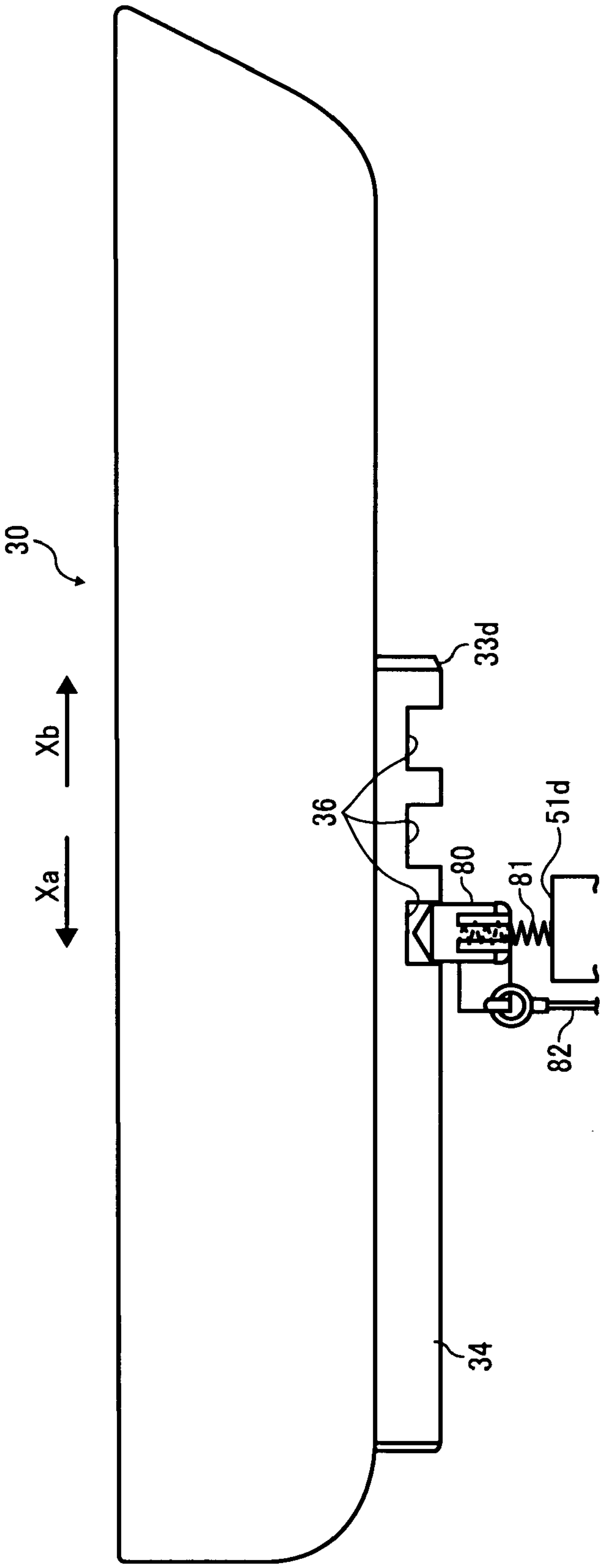
FIG. 20 illustrates the scanner locking mechanism of the other of the supports.

The projections 53 and 54 have a box form and ribs as illustrated in FIG. 14, and therefore have high mechanical strength. Therefore, even when a strong force is applied upward by users, occurrence of a problem in that the projections 53 and 54 are damaged or deformed can be prevented. In addition, as illustrated in FIG. 15, each of the front portion 53*a* (and 54*b*) and the rear portion 53*b* (and 54*b*) has a tapered portion 53*c* at the end thereof in the direction Xa. Therefore, when the scanner 30 is slid in the direction Xb, occurrence of a problem in that the front edge of the rail 34 (or 33) hits the edge of the front and rear portions 53*a* and 53*b* (or 54*a* and 54*b*) of the projection 53 (or 54). In addition, as illustrated in FIG. 20, each of the rails also has a tapered portion 33*d*. Therefore, occurrence of a problem in that the edges of the rails 33 and 34 hit the edges of the front and rear portions 54*a* and 54*b*, and 53*a* and 53*b*, respectively, resulting in defective sliding of the scanner, can be prevented.

As illustrated in FIG. 15, the front portion 53*a* (or 54*a*) has a length L sufficient for preventing a problem in that the rails 34 and 33 are disengaged from the front and rear portions 53*a*, 54*a*, 53*b* and 54*b* even when the scanner 30 is slid in the direction Xa. Therefore, occurrence of the problem in that the scanner 30 moves upward can be securely prevented.

Figure 16A:
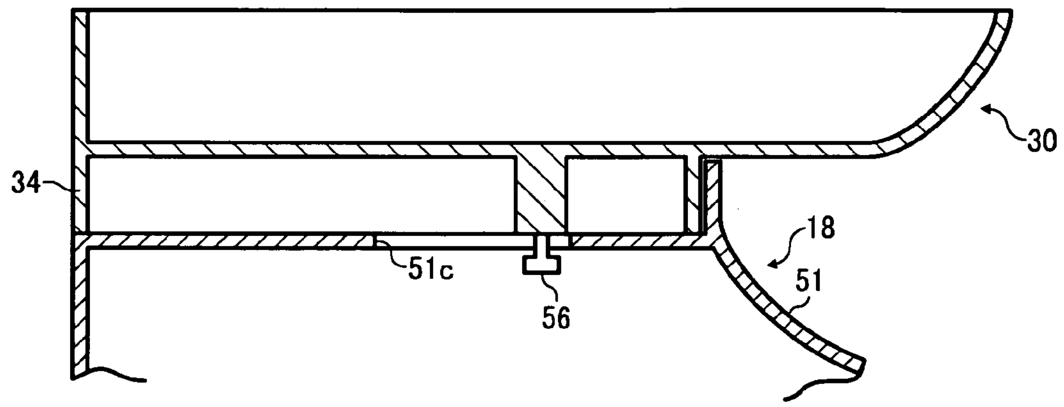
FIGS. 16A and 16B illustrate the scanner in the initial state, which is not slid, and the maximally slid scanner, respectively, for explaining the performance of the release preventing member.
Figure 16B:
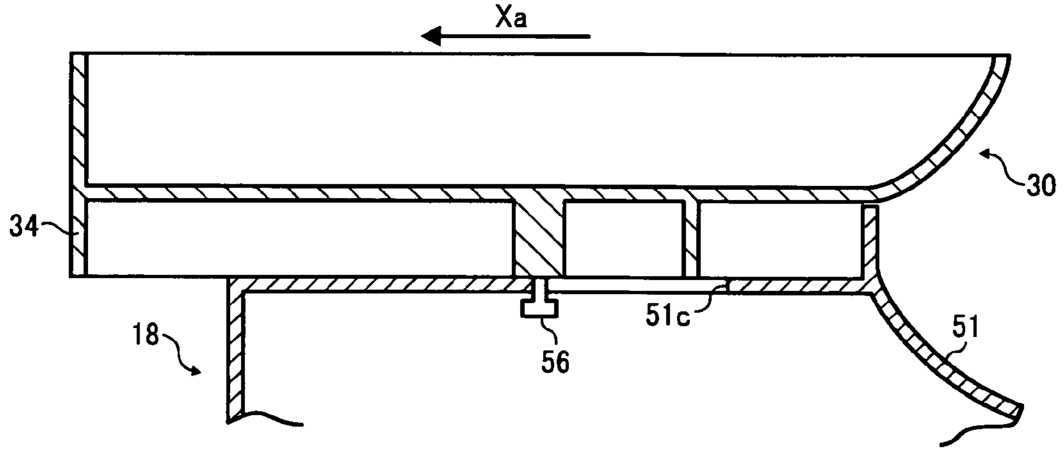

When the scanner 30 is set on the support 51 and 52, the rails 33 and 34 thereof are inserted to entrances 52*b* and 51*b* (illustrated in FIG. 12), respectively, to be slid in the direction Xb. As illustrated in FIG. 12, a groove 51*c* is provided in the support 51. The length of the groove 51*c* is the same as the maximum sliding stroke of the scanner 30. After the scanner 30 is set on the support 51 and 52 and then the upper cover 18 is opened, a stepped screw pin 56 (illustrated in FIGS. 16A and 16B) is engaged with rail 34 through the groove 51*c*. The stepped screw pin 56 prevents occurrence of a problem in that the scanner is released from the support 51 even when the scanner is slid in the direction Xa. FIG. 16A illustrates the initial state of the scanner 30 in which the scanner is not slid relative to the support 51, and FIG. 16B illustrates the slid state of the scanner in which the scanner is slid by the maximum stroke relative to the support 51. When the scanner 30 is detached from the supports, the operations mentioned above are reversely performed starting from detaching the stepped screw pin 56. Attachment of the scanner can also be performed using a rivet, a shouldered screw, or the like instead of the stepped screw pin 56.

As mentioned above, not only occurrence of the problem in that the scanner is released upward from the supports is prevented using the projections 53 and 54, but also occurrence of the problem in that the scanner is released from the rear side of the supports is prevented using the stepped screw pin 56. Therefore, even when a force is applied upward or in the sliding direction Xa to the scanner by users, occurrence of the problems in that the scanner is released from the supports 51 and 52 can be prevented. Thus, the image forming apparatus has a good reliability with respect to strength. In addition, the scanner 30 has a good assembling property because of being able to be easily attached to or detached from the supports 51 and 52.

In order to impart good security to the image forming apparatus of the present invention, two locking mechanisms are provided on the rear side of the right support 51, one of which locks the upper combination 26 when the ADF 32 and the platen cover 31 are opened, and the other of which locks the ADF 32 and the platen cover 31 when the upper combination 26 is opened as illustrated in FIG. 3. In contrast, the support 52 has configuration such that the cables used for transmitting the image signals obtained by the scanner 30 to the controller (not shown) in the main body 1 can be easily moved when the scanner is slid. In addition, cables used for transmitting the drive controlling signals for the ADF 32 are loosely set in the vicinity of the two locking mechanisms in the right support 51. By separating the cables for transmitting the image signals from the cables for transmitting the drive controlling signals for the ADF 32, occurrence of a problem in that the image signals are affected by noises can be prevented. In this example, the scanner 30 can be attached to or detached from the rear ends of the supports 51 and 52, and therefore a problem in that the cables are sandwiched by the scanner and the supports can be avoided.

The scanner 30 includes signal wires for transmitting signals, signal wires for a motor and a sensor of the scanner, etc. It is necessary to lead such signal wires to a controller board (not shown) provided in the main body 1 of the image forming apparatus. In addition, there is often a case where a controller board is arranged on the rear side of the image forming apparatus in view of arrangement of a harness. In such a case, it is preferable that signal wires are connected at the rear side of the scanner and the main body because the length of the wires can be shortened.

Figure 17:
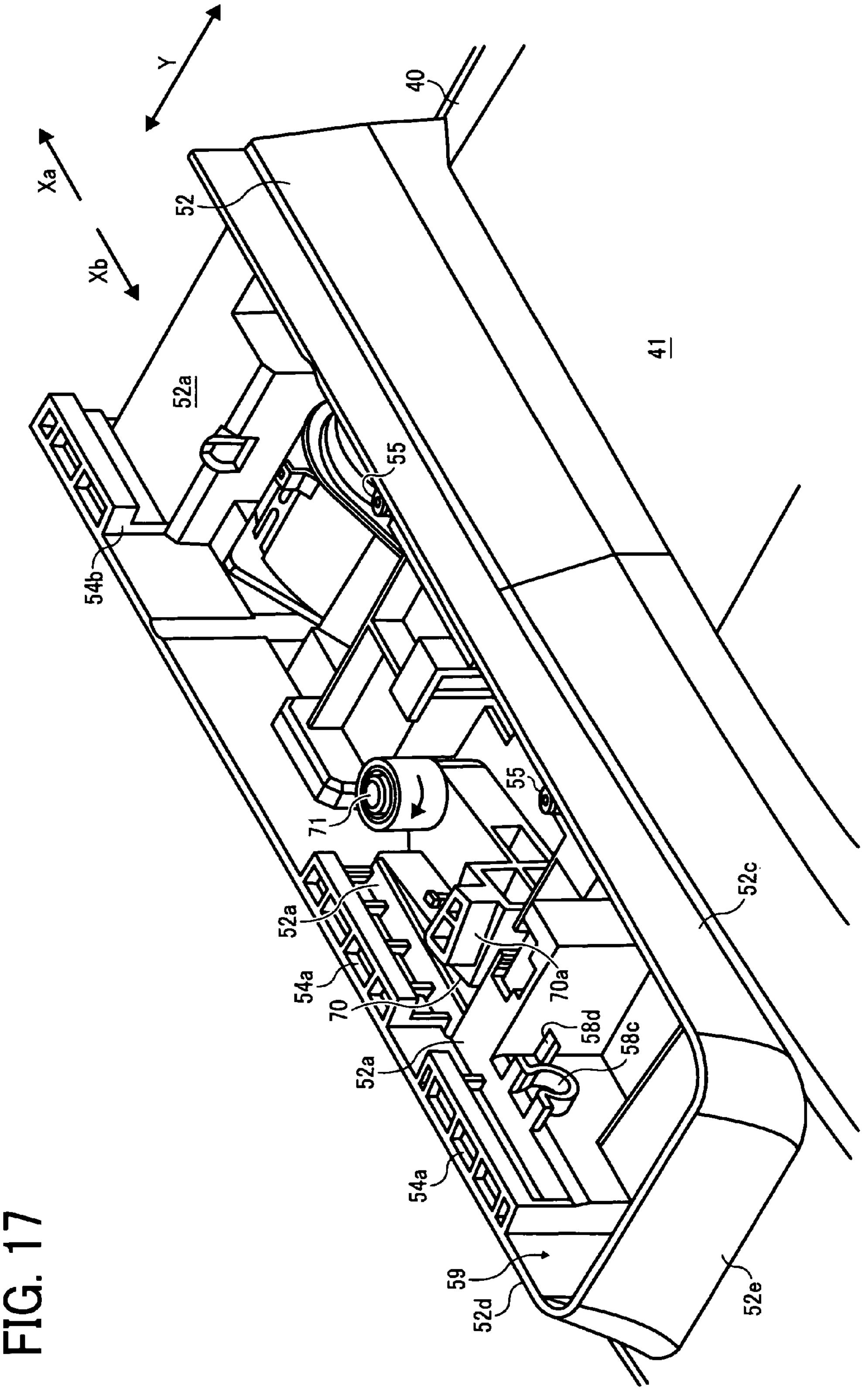
FIG. 17 illustrates the scanner locking mechanism of one of the supports.
Figure 18:
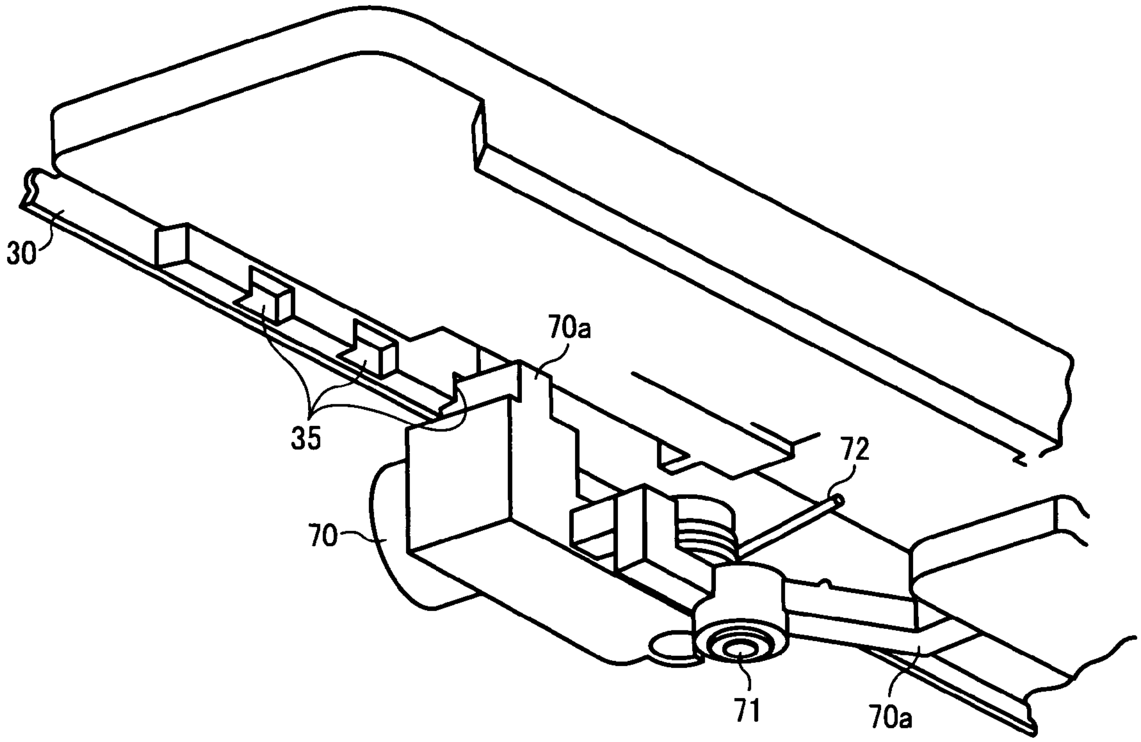
FIG. 18 illustrates the main portion of the scanner locking mechanism illustrated in FIG. 17.
Figure 19:
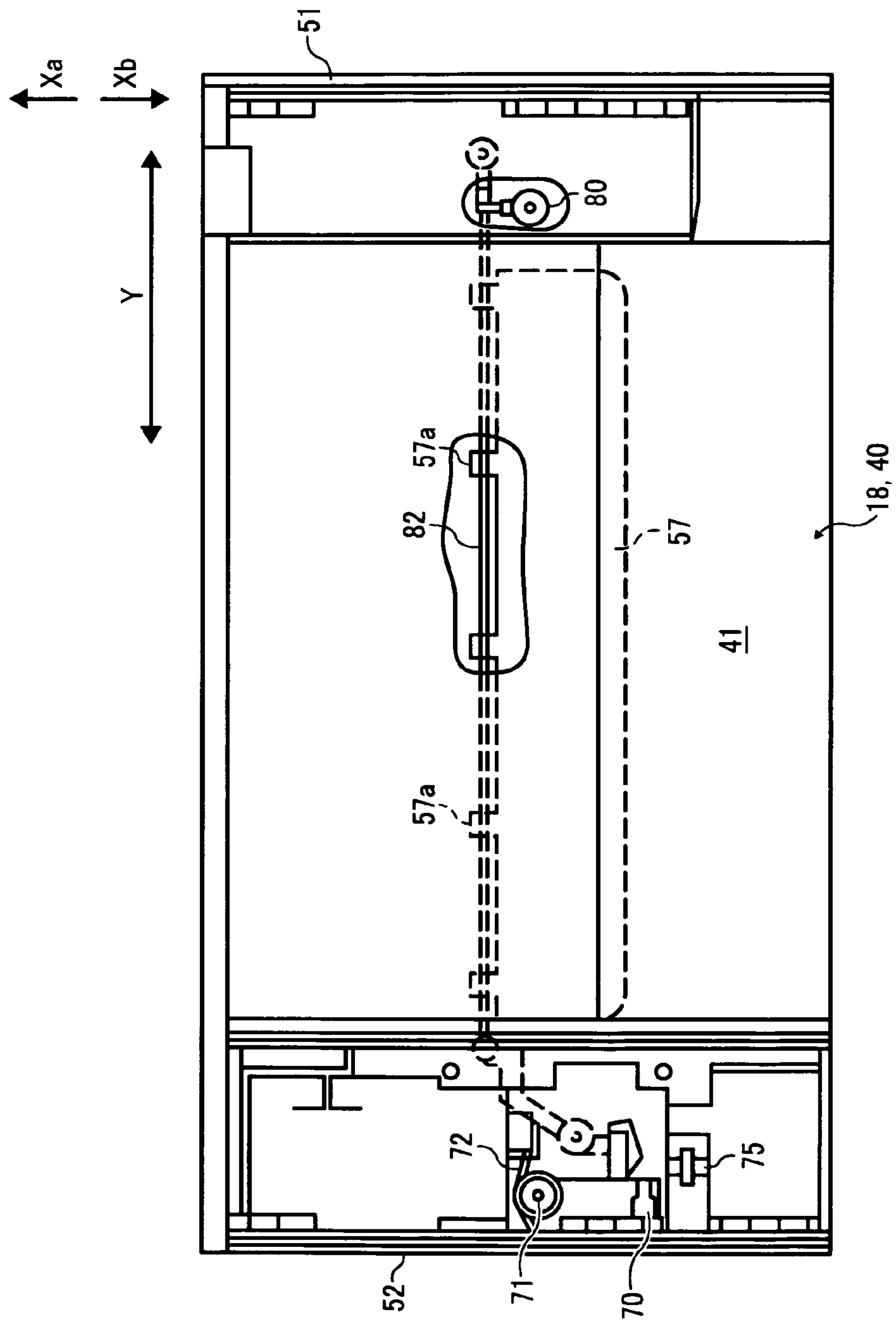
FIG. 19 illustrates the lock engaging mechanism.

As mentioned above, when a slidable scanner is used as the scanner 30, the scanner has to be locked at plural points. Therefore, the scanner locking mechanism is provided for the scanner 30. As mentioned above, the support 50 slidably supporting the scanner 30 has the two supports 51 and 52. The scanner locking mechanism is provided on the left support 52. As illustrated in FIG. 1 or 12, an operation button 70 is provided on one side of the support 52. FIGS. 12, 17 and 19 illustrate the inside of the support 52 to which the button is provided.

As illustrated in FIGS. 12, and 17-19, the operation button 70 includes a shaft 71, around which a coil spring 72 is provided to press the operation button 70 toward the outside of the apparatus. In addition, a hook 70*a* is integrated with the operation button 70. When the button 70 is pressed by the coil spring 72, the hook 70*a* is engaged with one of recessed portions 35 formed on the rail 33 of the scanner 30, thereby preventing the scanner 30 from being slid. When the operation button 70 is pushed against the bias force of the coil spring 72, the hook 70*a* is disengaged from one of the recessed portions 35, and thereby the scanner can be slid. Since the rail 33 has plural recessed portions (in this example, three recessed portions), the scanner 30 can be locked at each of the plural (three) positions.

As mentioned above, the horizontal backlash of the scanner 30 is prevented by engaging the two pins 55 (illustrated in FIG. 12) with the groove 33*c* provided on the rail 33 of the scanner 30 and illustrated in FIG. 13. Thus, various functional parts are arranged in the support 52, and therefore there is an upper limit of the distance between the two pins 55. In addition, in order to reduce the manufacturing costs of the image forming apparatus, the pins 55 are integrated with the sheet stacker 40 and the supports 51 and 52 and are made of a plastic, and the groove 33*c* is integrated with the case of the scanner 30 and is made of a plastic. Specific examples of such a plastic include combinations of polycarbonate and polystyrene, which are optionally treated with a fire retardant so as to obey the regulations of each country. Therefore, there is a limit of the precision in engagement therebetween, and the precision is inferior to that of the parts made of a metal. Therefore, even when sliding of the scanner 30 is locked, the scanner has horizontal backlash relative to the supports 51 and 52, and therefore balance between the right and left sides of the scanner is bad.

In this example, another slide locking mechanism is provided on the right support 51 to reduce the horizontal backlash of the scanner 30. By thus forming the locking mechanisms on the right and left supports 51 and 52, the backlash can be minimized because the distance between the locking mechanisms can be prolonged so as to be relatively long compared to the size of the main body 1.

Referring to FIG. 20, the right support 51 has a cylindrical locking member 80, which is pressed upward by a compression spring 81, and is engaged with a groove 36 formed on the rail 34 of the scanner 30. The upper end of the compression spring 81 is stopped by the lower end of the locking member 80, and the lower end of the spring 81 is stopped by a surface 51*d* of the support 51. The operation button 70 in the left support 52 is connected with the locking member 80 using a flexible wire 82 (illustrated in FIG. 19). As illustrated in FIGS. 19 and 20, the wire 82 is curved by an angle of 90° at the right side thereof (i.e., in the right support 51. The wire 82 is connected with the stopping position of the locking member. Therefore, by pushing the operation button 70, the two locking mechanisms can be operated. As illustrated in FIG. 19, the wire 82 is guided by grooves (not shown) provided in the ribs on the backside of the upper cover 18 and guides 57*a* of a wire pressing member 57 provided on the backside of the upper cover 18 so as not to loosen. Thus, the two locking mechanisms can be operated at the same time by a simple and low-cost method of using a wire for connecting the two separated locking mechanisms even when the passage between the two locking mechanisms is complex. This method of using a wire is particularly effective for this example of the image forming apparatus, in which the locking mechanisms are provided on the projected supports 51 and 52, and therefore have to be connected through a U-form passage to be operated at the same time.

Figure 21A:
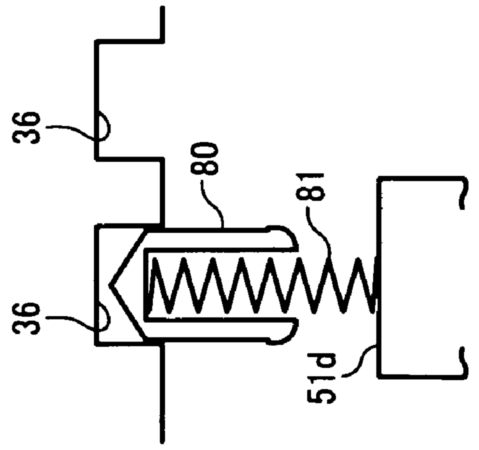
FIGS. 21A-21C illustrate how the locking mechanism is engaged with a groove.
Figure 21B:
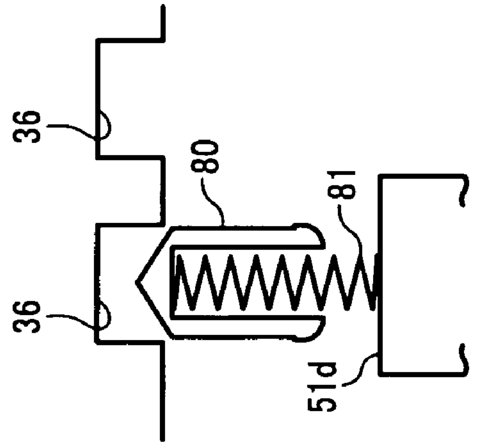
Figure 21C:
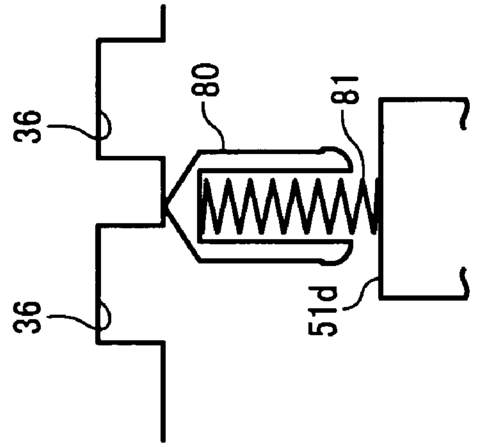

When the operation button 70 is pushed against the coil spring 72 and the compression spring 81, the locking member 80 is pulled by the wire 82, thereby lowering the locking member 80, resulting in disengagement of the locking member with the groove 36 of the scanner 30. In this case, as illustrated in FIG. 21B, the locking member 80 is not completely released from the groove 36, and the tip of the locking member is still present in the groove 36. In this case, when the scanner 30 is slid, the groove 36 presses down the locking member 80, resulting in occurrence of clicking. In addition, when the scanner is further slid, the locking member 80 is engaged with another of the groove 36, resulting in occurrence of clicking. Therefore, the users can be sensuously notified that the scanner is locked due to this clicking.

The upper combination 26, which is illustrated in FIG. 3 and which is constituted of the scanner 30, the sheet stacker 40 and the upper cover 18, is pivoted around the hinge 17 to be opened and closed. Therefore, consumable supplies such as toner cartridges and replacement parts such as transfer belts can be easily replaced through the open space. The tandem image forming apparatus illustrated in FIG. 3 has four image forming devices, which are serially arranged horizontally. In order to detach and attach the process cartridges (image forming devices), the upper combination 26 has to be opened at an angle of about 90°. In this case, if the operation button 70 is mistakenly pushed (which results in unlocking), the scanner falls by its own weight. In order to prevent occurrence of such an accident, the projections 53 and 54 are provided. However, a problem such that the scanner 30 hits the operator may occur. Therefore, it is necessary to prevent occurrence of such a scanner dropping problem by using the following method.

Specifically, as illustrated in FIG. 19, a swinging member 75 is provided on the support 52 so as to be able to be horizontally rotated. When the upper combination 26 including the upper cover 18 is opened, the swinging member 75 is rotated by its own weight, and is moved to the passage of the operation button 70. Therefore, when the upper combination 26 is opened, the operation button 70 cannot be pushed, resulting in prevention of occurrence of the scanner dropping problem.

The present inventors performed a test in which an image forming apparatus having the same configuration and weight as those of the above-mentioned image forming apparatus is transported while grasping the upper unit. As a result, a problem in that the scanner is released from the release preventing member 53 and 54 was not caused. In addition, another problem in that the parts of the scanner 30 and image forming section 2 are deformed or damaged was not caused. Thus, the image forming apparatus has good strength reliability.

Next, the opening formed in the vicinity of the sliding mechanism and the covering member for covering the opening will be explained by reference to FIGS. 12, 17 and 22-29.

As mentioned above, upward releasing of the scanner 30 is prevented by engaging the rails 33 and 34 with the projections 54 and 53 (serving as release preventing members) as illustrated in FIGS. 12-14. Since it is considered that a load is applied to the scanner 30 (for example, the operator puts his or her hands thereon), it is preferable that the supports 51 and 52 have sufficient length in the directions Xa and Xb. Therefore, it is particularly preferable to extend the upper surface 52*a* and the projection 54 in the support 52 as long as possible in order to support the scanner 30.

In this case, when the scanner 30 is slid in the direction Xa to improve the copy visibility, the front portion of the upper surface 52*a* and the front portion of the projection 54 are exposed. If the surfaces are a simple plane, no problem will occur. However, the surfaces have recessed and projected portions to be engaged. Therefore, it is a problem from a safety standpoint. It may be considered that the support 52 is designed such that the front portion thereof is a flat plane having no recessed and projected portions. In this case, the flat plane has to be located over the sliding surface (hereinafter sometimes referred to as an interface) between the upper surface 52*a* and the bottom surface 33*a* of the rail 33 (see FIG. 14) to prevent occurrence of a problem in that the front portion or side portion of the sliding surface is exposed. When such a flat plane is not formed, a problem in that a finger is wedged by the scanner and the support can occur.

In this example, it is tried to miniaturize the scanner 30. As mentioned above by reference to FIGS. 7-9, the scanner 30 includes a scanning unit (not shown) for reading the image of an original document, and the driving motor 131 for driving the scanning unit. The driving force of the motor 131 is transmitted to the scanning unit via a timing belt 135 (illustrated in FIG. 9), etc.

The thickness of the scanning unit cannot be changed in the moving range thereof (i.e., in the entire portion of the scanner 30). Since the driving motor 131 is fixed, only the portion of the scanner, at which the motor is set, has to be thicker than the other portions of the scanner. Therefore, it is preferable to downward project the portion of the scanner for the motor 131. However, the projected portion is located over the sheet stacker 40, problems in that the copy sheets hit the projected portion, and the number of stacked copy sheets is decreased occur. The problems can be avoided by forming the projected portion in a location (for example, in the support 52) other than the locations over the sheet stacker 40.

When the projected portion is contained in the support 52 while the above-mentioned interface is maintained, the opening 59 (illustrated in FIGS. 12 and 17) is formed so that the projected portion is contained in the support 52. The opening 59 is formed in the vicinity of the front portion of the projection 54*a* and the upper surface 52*a*. More specifically, the opening 59 is formed while surrounded by a pair of side walls 52*c* and 52*d* and another side wall 52*e*. The reason why the side walls 52*c*, 52*d* and 52*e* are integrated is to enhance the mechanical strength of the support 52, particularly the strength of the projection 54*a*.

When the scanner 30 is slid in the direction Xb, a problem in that a finger is wedged by the front side of the scanner and the side wall 52*e* can occur. Therefore, it is preferable to provide a mechanism for covering the opening 59 in conjunction with the sliding of the scanner 30.

FIGS. 22-29 illustrate a covering member 90, which can move from a first position (i.e., covering position), at which the covering member 90 covers the opening 59, to a second position (i.e., waiting position), into which the covering member 90 is retracted from the first position. The covering member 90 includes shafts (projected portions) 91*a* and 91*b* around which the covering member 90 is pivoted, a first spring holding member 93*a* and a second spring holding member 93*b* for holding a torsion spring 98 (illustrated in FIGS. 23-26), swing regulation members 94*a*, 94*b* and 94*c*, a torsion spring winding potion 95, a stopper 96, and covering surfaces 92 and 97. These parts are integrated while being made of a plastic such as the plastics mentioned above.

As illustrated in FIGS. 23-26, the torsion spring winding portion 95 is formed between the shafts 91*a* and 91*b*. When the covering member 90 is set on the front side of the support 52, a first end 98*a* of the torsion spring 98 is fixed while sandwiched by the first and second spring holding members 93*a* and 93*b*. A second end 98*b* of the torsion spring 98 is stopped by a sprig stopper 58*a* (illustrated in FIG. 25) formed on the bottom of the support 52. Thus, the twisting moment of the torsion spring 98 can be transmitted to the covering member 90.

The shafts 91*a* and 91*b* have cut portions having an oval section and a diameter smaller than the diameter of the shafts. The support 52 has two bearing members 58*b* and 58*c*, each of which has an opening, which faces upward and which is slightly greater than the width of the cut portions of the shafts 91*a* and 91*b*. Therefore, the shafts 91*a* and 91*b* can be easily set to the respective bearing members 58*b* and 58*c* by rotating the shafts. In this case, the second end 98*b* of the torsion spring 98 is contacted with the stopper 58*a* formed on the bottom surface of the support 52 to be stopped.

After the shafts 91*a* and 91*b* of the covering member 90 are set to the bearing members 58*b* and 58*c*, respectively, the covering member 90 can be swung toward the front side of the image forming apparatus. In this case, due to the elastic force of the torsion spring 98, a force is always applied in such a direction that the covering member 90 acquires the first position (i.e., covering position). In this regard, the stopper 96 is provided to prevent the cut portions of the shafts 91*a* and 91*b* from releasing from the bearing members 58*b* and 58*c*. The stopper 96 can be bent in the direction parallel to the shafts 91*a* and 91*b* of the covering member 90. Specifically, when the covering member 90 is swung around the shafts 91*a* and 91*b*, the stopper 96 is contacted with a swing stopper 58*d* formed on the support 52, and then bent. When the covering member 90 is further swung, the stopper 96 climes over the swing stopper 58*d*, and therefore the stopper 96 cannot return. Since the stopper 96 cannot return, the stopper 96 is stopped at the position. Therefore, occurrence of the problem in that the cut portions of the shafts 91*a* and 91*b* face the openings of the bearing members 58*b* and 58*c*, resulting in releasing of the covering member 90 from the bearing members 58*b* and 58*c* can be prevented. In this regard, it is preferable that the angle of the covering member 90 in the waiting state is not less than the angle at which the covering member is used, and is not greater than the angle at which the covering member is attached to the support 52. In addition, the covering member 90 has the covering surfaces 92 and 97, and the swing regulation members 94*a*, 94*b* and 94*c*. The operations of the members will be explained below.

Figure 28A:
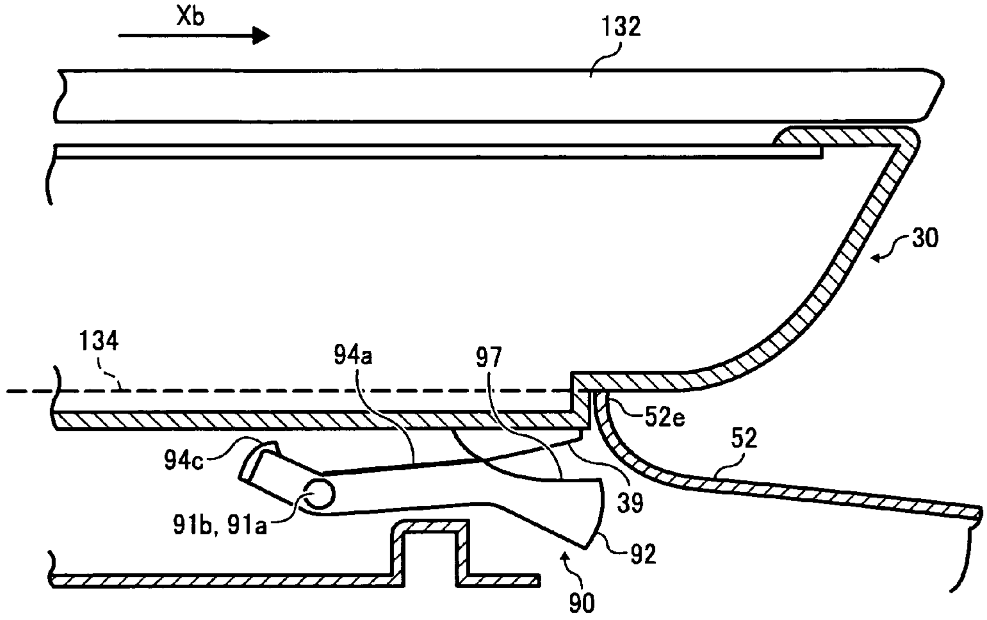
FIGS. 28A and 28B illustrate the engaging states of the covering member with the scanner when the scanner is slid to the forefront and the backmost position, respectively.

The movement of the covering member 90 due to sliding of the scanner is as follows. As illustrated in FIGS. 8 and 28A, a plate-form engaging member 39 is integrated with the bottom of the scanner 30 over which the driving motor 131 is present. The engaging member 39 is a kind of cam, and has such a shape as to be slid or engaged with the swing regulation members 94*a* and 94*c* in the sliding range of the scanner 30.

Figure 27A:
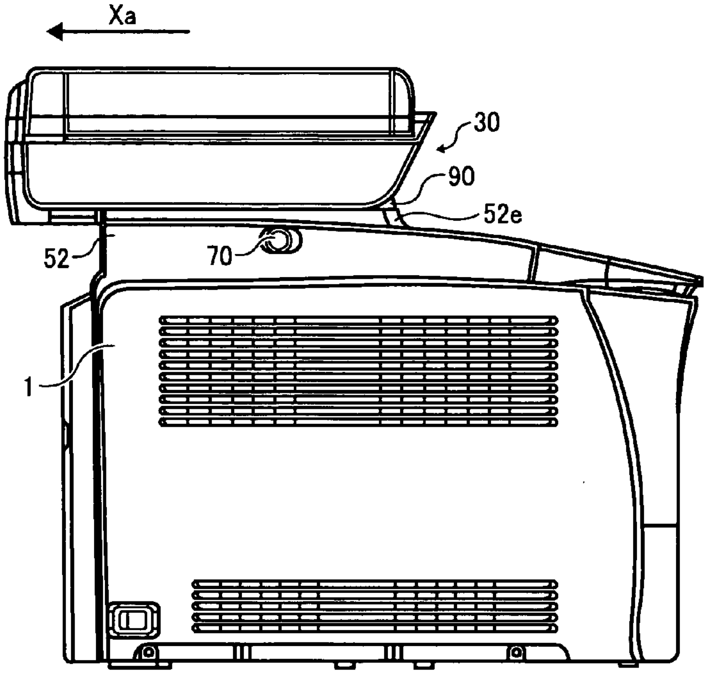
FIGS. 27A and 27B illustrate the scanner, which is slid to the backmost position, and the scanner, which is slid to the forefront, respectively.
Figure 27B:
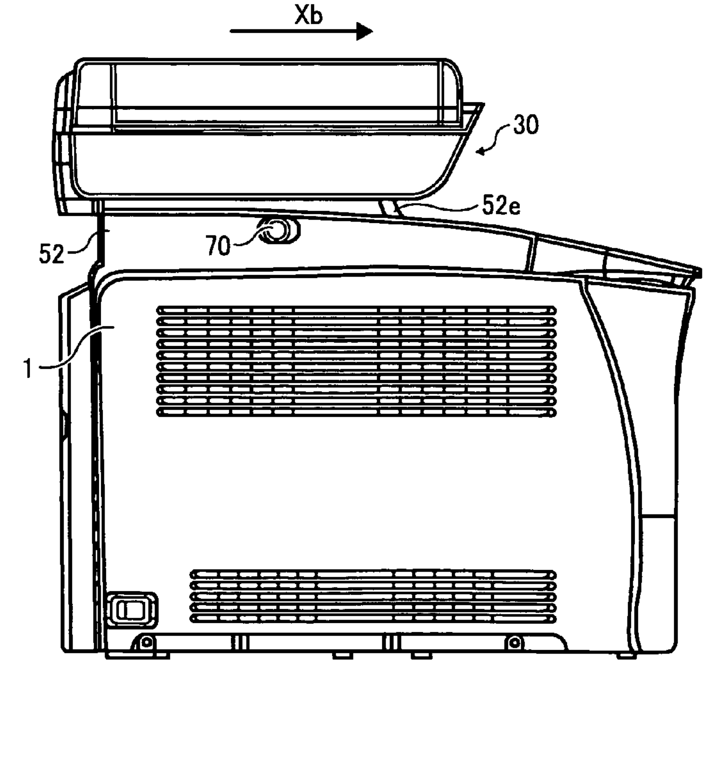

The swing regulation member 94*a* of the covering member 90 is contacted with the engaging member 39 to control the magnitude of swinging displacement of the covering member. As mentioned above, the scanner 30 is attached to the image forming apparatus from the rear side thereof (i.e., the scanner is slid in the direction Xb). When the scanner 30 is slid in the direction Xb against the bias of the torsion spring 98 and has the state as illustrated in FIGS. 27B and 28A, the front portion of the engaging member 39 is contacted with the swing regulation member 94*a*. Thereby, the covering member 90 is swing clockwise around the shafts 91*a* and 91*b*. After the front portion of the engaging member 39 is contacted with the swing regulation member 94*a*, the covering member 90 is further swung clockwise while the rear portion of the engaging member 39 is contacted with the swing regulation member 94*a*. When the scanner 30 is further slid and has the most advanced position, the rear portion of the engaging member 39 is engaged with the swing regulation member 94*a* and presses the swing regulation member, and thereby the covering member 90 achieves the waiting state as illustrated in FIGS. 8, 27B and 28A.

In this case, the backside of the scanner 30 is on the same level as that of the main body 1, and therefore the image forming apparatus has a minimum size. When the apparatus achieving this state is packed to be shipped, the amount of packing materials can be reduced. In addition, the volume of the packed apparatus is minimized, and thereby a large number of apparatuses can be transported by one auto truck. It is environmentally friendly. Since the scanner 30 is attached using the stepped screw pin 56 (illustrated in FIG. 16), occurrence of a problem in that the scanner is released from the supports 51 and 52 can be prevented.

Figure 28B:
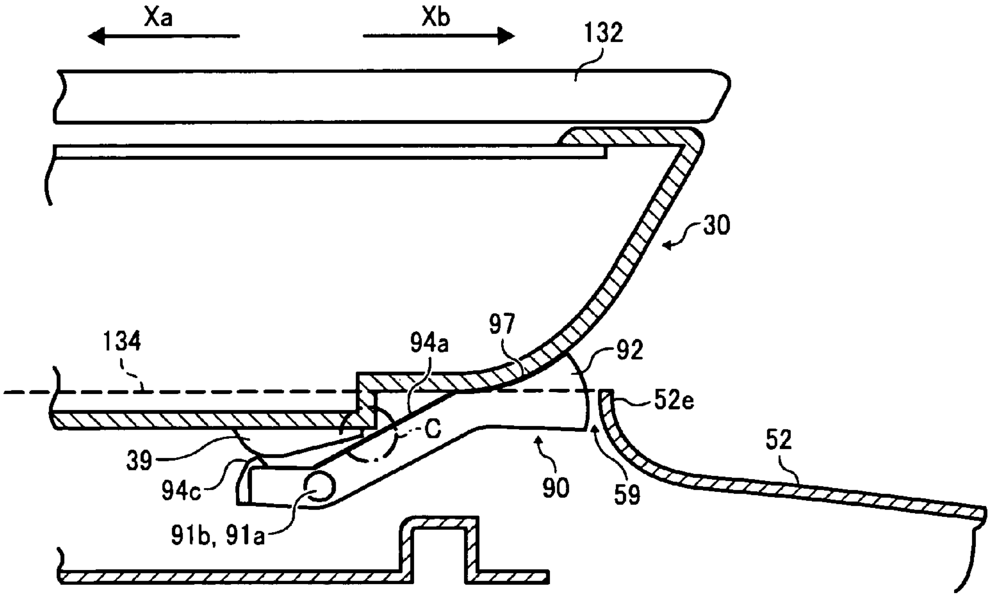
Figure 29:
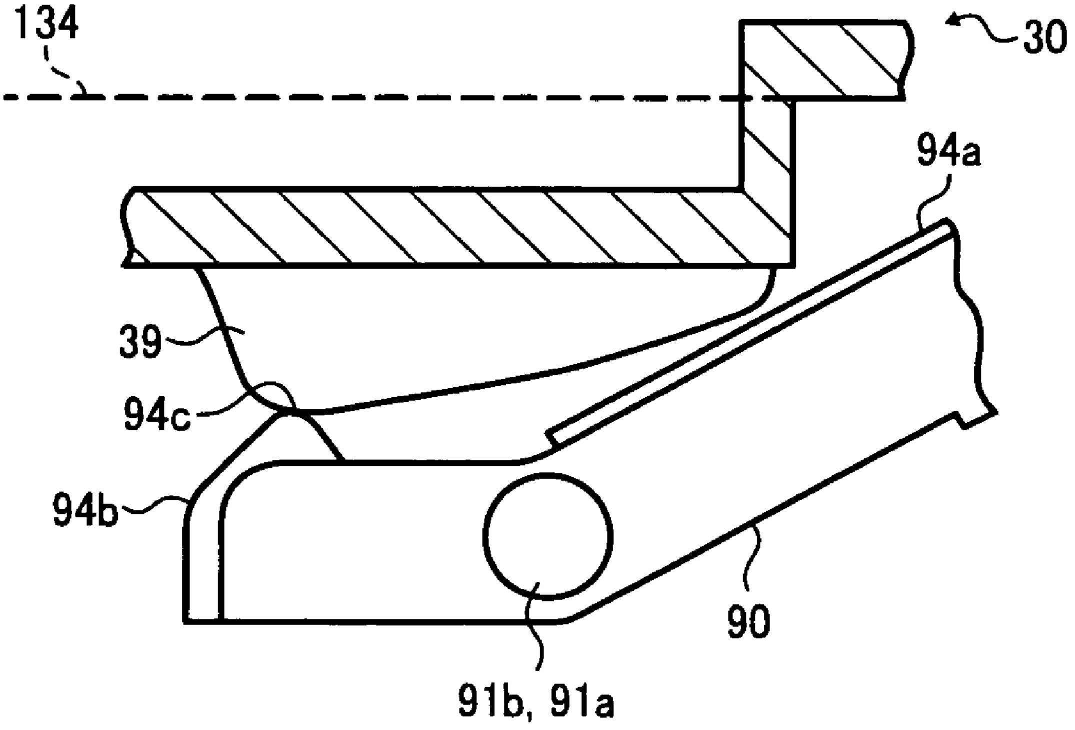
FIG. 29 is an enlarged view of the portion C in FIG. 28B.

Next, the operation of the image forming apparatus in the case where the scanner is slid to the rear side will be explained. When the scanner 30 is slid in the direction Xa in order to enhance the copy-pick-up operability, the scanner acquires the rear end position as illustrated in FIG. 28B and the covering member 90 is swung to acquire the covering position. In this case, as illustrated in FIGS. 28B and 29, only the projected portion of the engaging member 39 on the rear side thereof is engaged with the swing regulation member 94*c*. In other words, the front portion of the engaging member 39 is not contacted with the swing regulation member 94*a*. In this case, only the covering surface 92 can be observed from the outside as illustrated in FIG. 28B, and the opening 59 can be covered almost perfectly with the covering member 90.

In other words, although the covering member 90 has the covering surface 97, which is perpendicular to the swinging direction thereof, the covering surface 97 is not exposed to the opening 59. Therefore, a problem in that the operator touches the covering surface 97, and thereby the covering surface 97 is pushed in the swinging direction can be avoided. Thus, the covering member 90 produces good covering effect. In addition, a problem in that the covering member 90 is damaged can be avoided.

Specifically, the covering surface 92 is a cylindrical surface having the same axis as the shafts 91*a* and 91*b*. Therefore, when the scanner is slid in the direction Xa, the opening 59 can be covered with the covering surface 92 without forming a large gap between the covering surface 92, and the surrounding members such as the walls 52*e*, 52*c* and 52*d* and the front edge of the scanner 30. The gap between the covering surface 92 and the surrounding members is preferably not greater than 1 mm in order to prevent a problem in that a clip is dropped into the support 52. In this example, the covering surface 92 is a cylindrical surface, but is not limited thereto. For example, a spherical surface having the same axis as the shafts 91*a* and 91*b* can also be used as the covering surface 92.

The covering surface 97 has the same shape as that of the front wall of the scanner 30. When the scanner 30 is slid in the direction Xa, the covering surface 97 is swung counterclockwise around the shafts 91*a* and 91*b* by the bias of the torsion spring 98, and is contacted with the front surface of the scanner 30. Therefore, the gap between the covering member 90, and the surrounding members such as the walls 52*e*, 52*c* and 52*d* and the front edge of the scanner 30 can be minimized. Therefore, the problems in that a finger is wedged by the scanner and the walls, and a foreign material such as clips is dropped into the support 52 can be avoided. Thus, the safety and reliability of the image forming apparatus can be enhanced.

Figure 22:
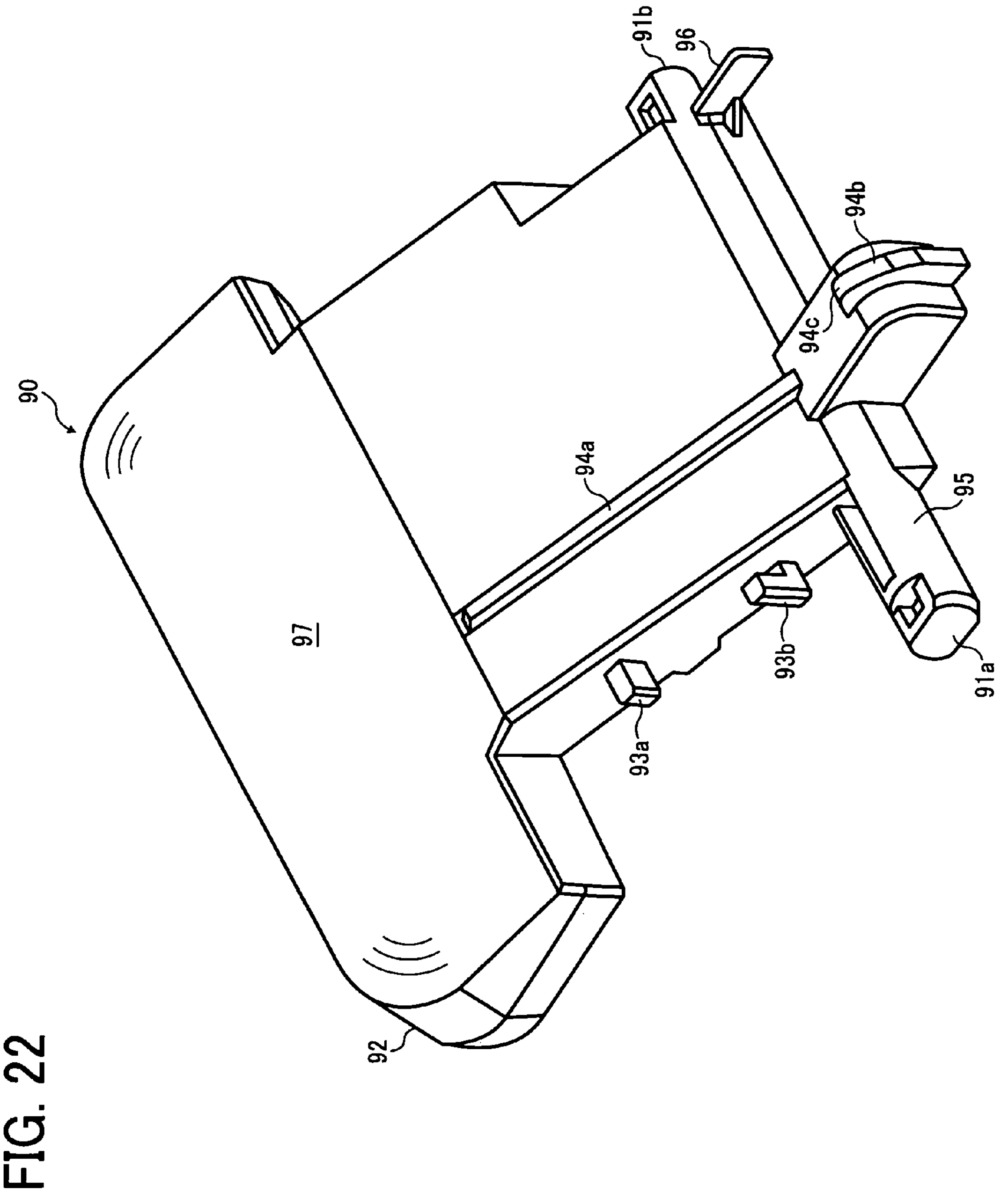
FIG. 22 illustrates the covering member of the image forming apparatus.
Figure 23:
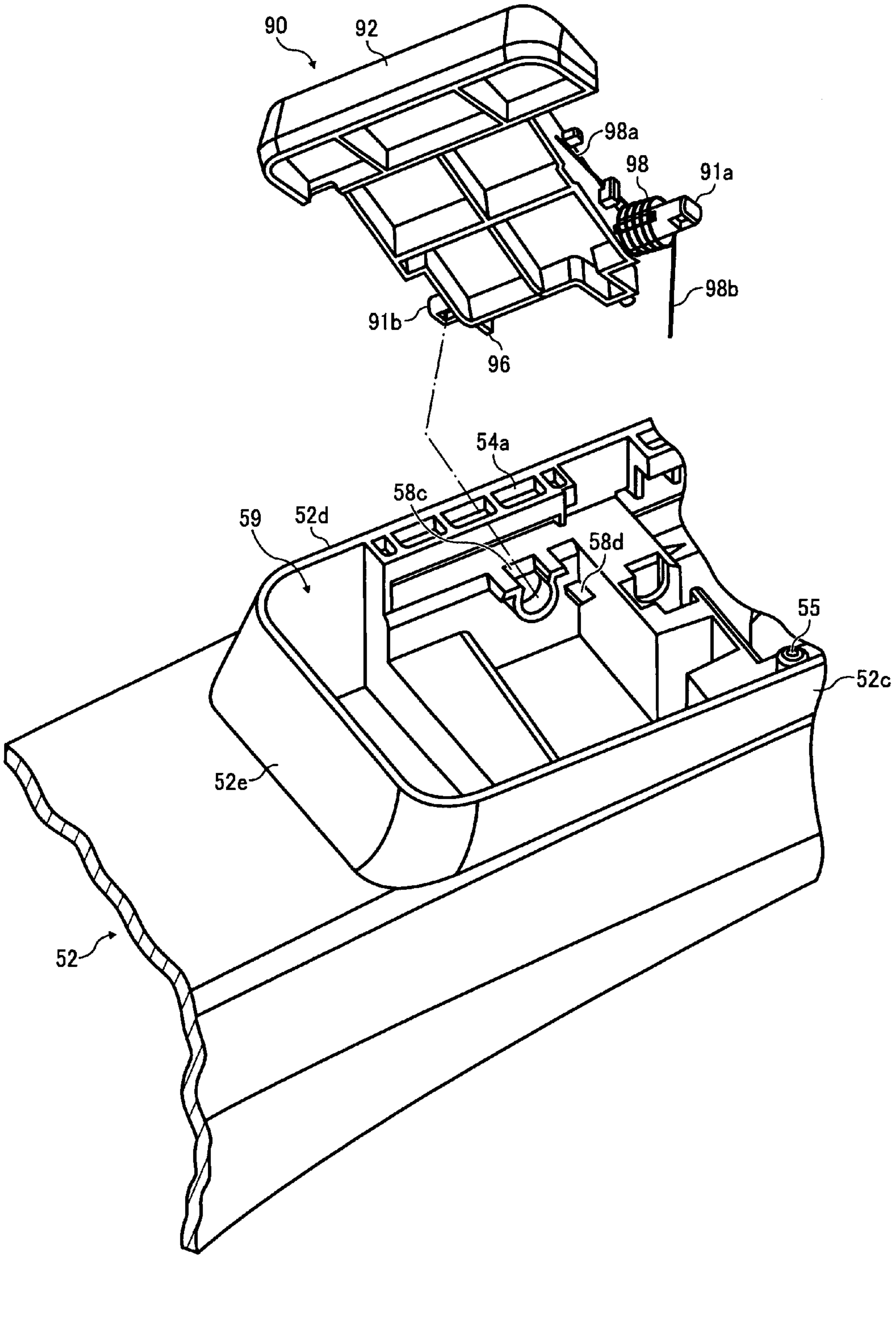
FIGS. 23-25 are schematic perspective views for explaining how to attach the covering member to the bearings of the left support.
Figure 24:
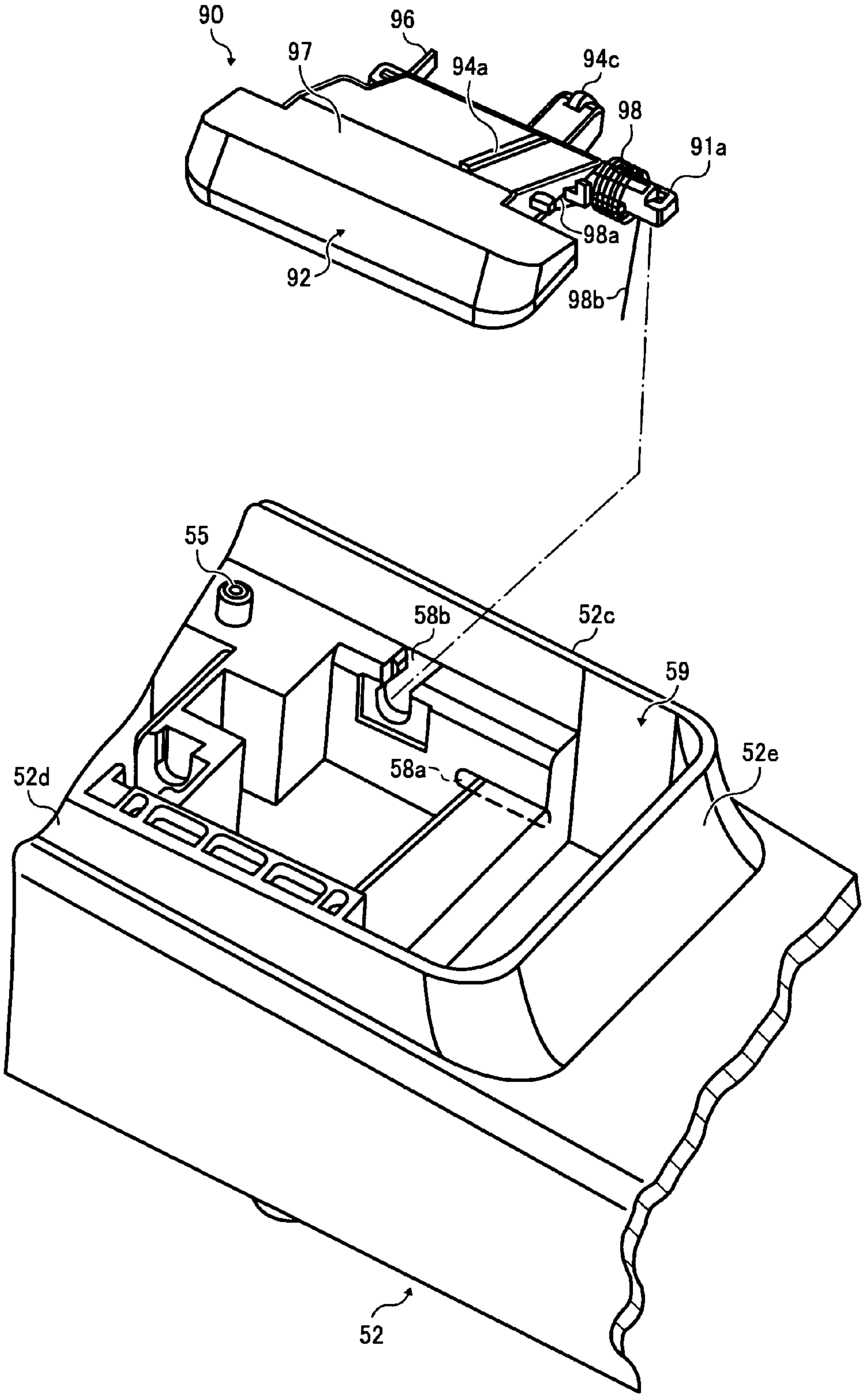
Figure 25:
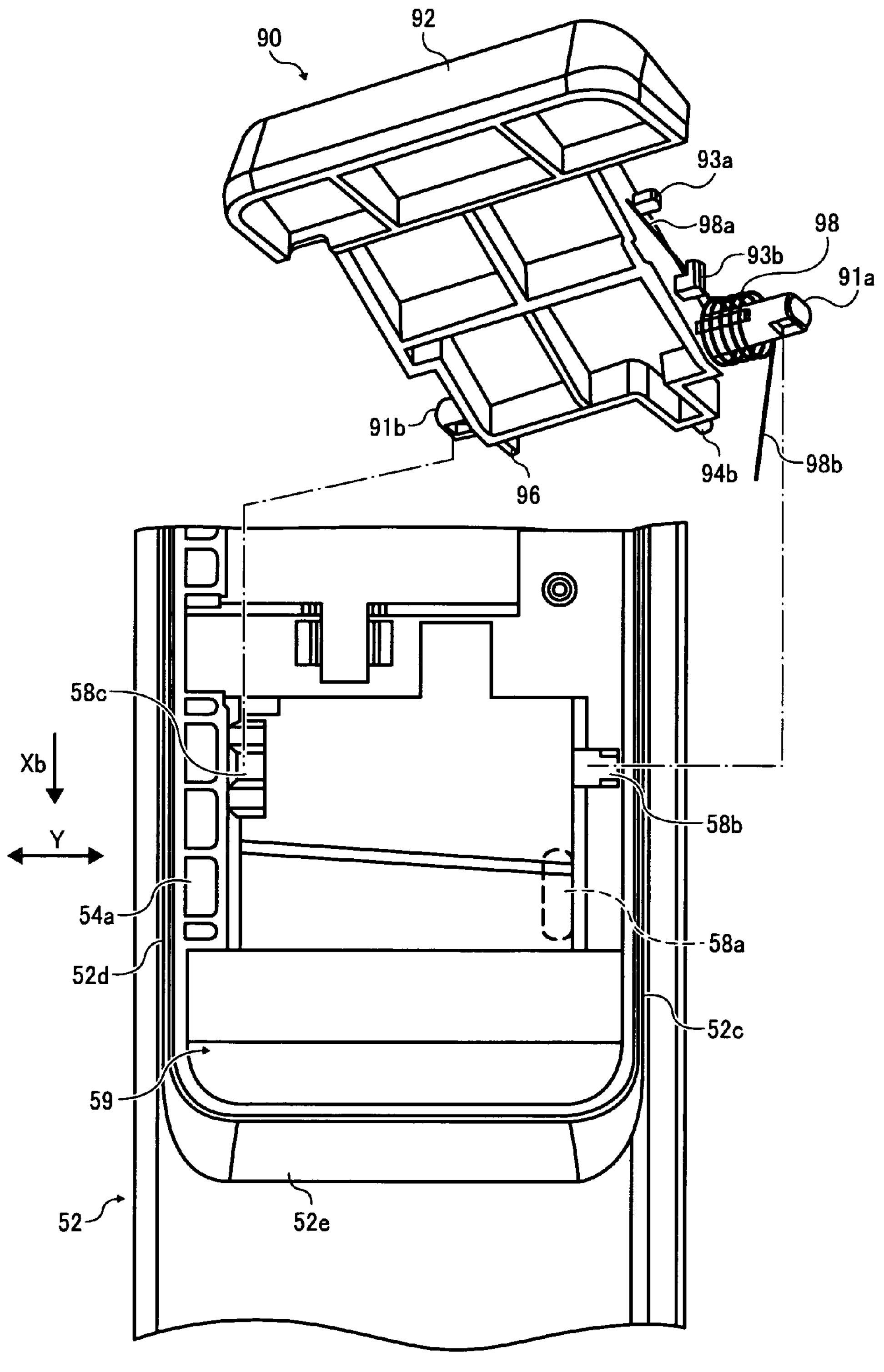
Figure 26:
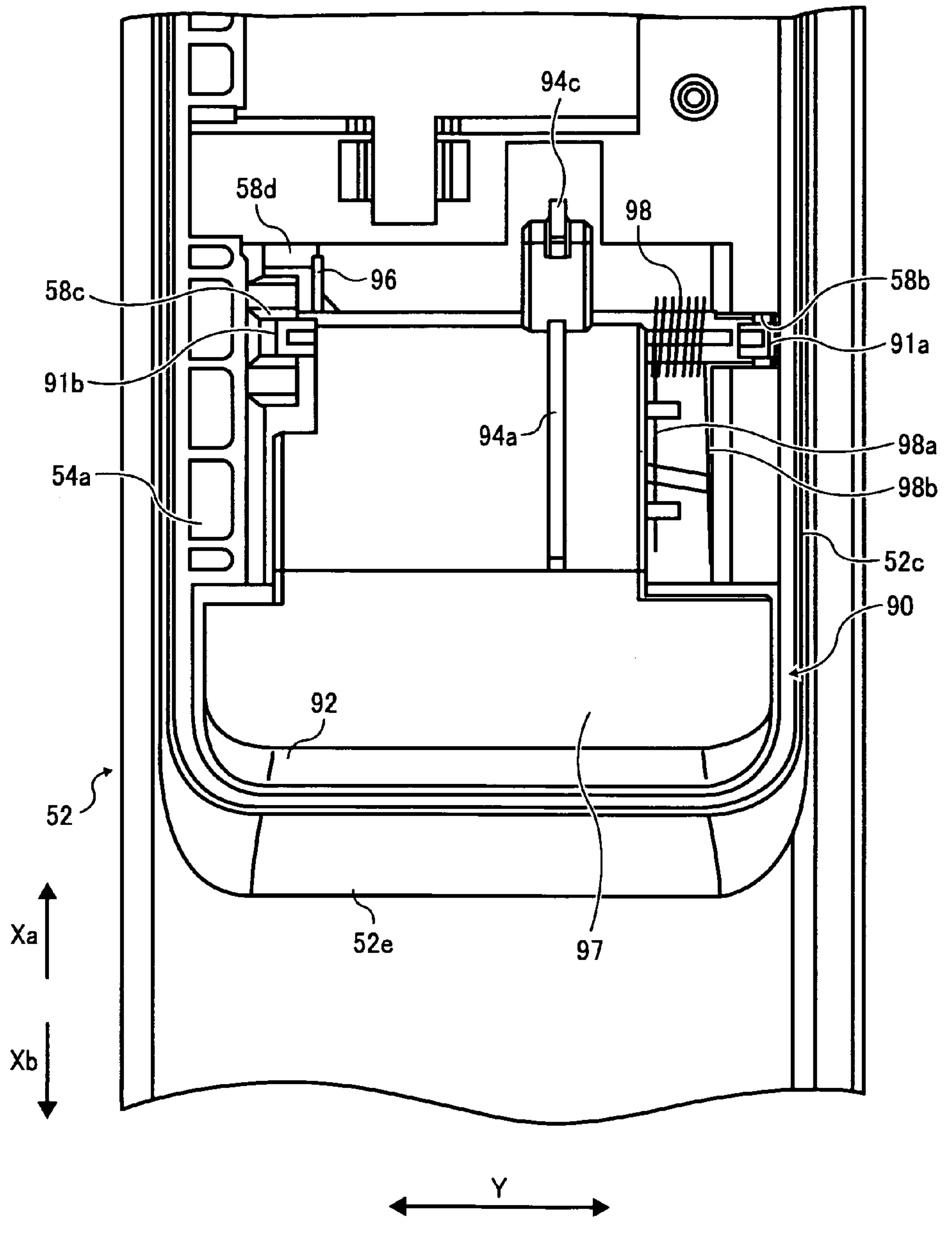
FIG. 26 is a schematic plan view illustrating the covering member attached to the left support.

When the covering surface 92 is swung and raised only by the bias of the torsion spring 98, the problems in that a finger is entered into the support 52 and a foreign material such as clips is dropped into the support 52 may occur when an operator presses the covering member 90. In this example, as illustrated in FIGS. 22 and 28B, the swing regulation member 94*c* is engaged with the engaging member 39 of the scanner 30, and thereby the covering surface 92 cannot be pushed by an operator (i.e., the space 59 is not opened). In this case, the swing regulation member 94*c* serves as a push-in preventing member for preventing the covering surface from being pushed into the support 52 when the covering member acquires the first position (i.e., the covering position). The swing regulation member 94*c* serving as the push-in preventing member also serves as a displacement controlling member for controlling the swing angle thereof by being selectively engaged with the engaging member 39.

In this example, the shapes of the covering surfaces 92 and 97 have been explained in detail. However, the shapes are not limited thereto. For example, the front wall 52*e* can be deleted if the support has sufficient mechanical strength. In this case, it is preferable to use a covering member having such a shape as to fit the support having no front wall. In addition, the above-mentioned example of the covering member is useful for cases where the sliding position is fixed. However, a covering member having a plate form can cover the opening even when the sliding position is not fixed.

In addition, if the scanner 30 has little vertical backlash and the engaging member 39 of the scanner and the swing regulation member 94*c* of the covering member 90 have high positional precision, the torsion spring 98 is not necessary for covering the opening with a small gap.

As mentioned above, the image forming apparatus of the present invention has the following advantages.

(1) The image forming apparatus is a cavity type image forming apparatus having a sliding mechanism configured to slidably support the scanner 30 in the directions Xa and Xb. When the scanner 30 is slid in the direction Xa to increase the space 42, the support 52 has the opening 59 on the front side thereof, but the covering member 90 covers the opening in conjunction with sliding of the scanner. Therefore, problems in that a finger is wedged by the scanner and the support and a foreign material such as clips is dropped into the support through the opening 59 can be avoided. Therefore, the image forming apparatus has a good combination of safety and reliability.

(2) The image forming apparatus discharges copy sheets on the copy stacker 40 from the front side to the rear side thereof. In addition, the scanner 30 can be slid in the direction Xa, the image forming apparatus has good copy visibility.

(3) The covering member 90 can be selectively engaged with the engage member 39 of the scanner 30, and thereby the swing angle of the covering member can be controlled. Therefore, the covering member can be smoothly moved without causing friction with the support 52.

(4) The covering member 90 has the covering surface 97 which is perpendicular to the swinging direction of the covering member and which is not exposed to the opening 59. Therefore, a problem in that an operator pushes the covering member 90, resulting in exposure of the opening can be avoided. Thus, the safety of the image forming apparatus can be further enhanced.

(5) The covering member 90 is swingably supported on the side of the image forming section 2, and therefore the member to be moved in the direction perpendicular to the swinging direction can be smoothly moved.

(6) The covering surface 92 of the covering member 90 has a cylindrical or spherical surface having almost the same axis as the swinging axis. Therefore, the same effects as those in paragraphs (4) and (5) can be produced. In addition, the space 59 is well covered with the covering surface 92 without a gap or with a small gap in the process of or after swinging of the covering member.

(7) When the covering member 90 acquires the first position (i.e., covering position), the problem in that an operator pushes the cover, resulting in exposure of the opening 59 can be avoided because the swing regulation member 94*c* prevents the covering surface 92 from being pushed into. Therefore, the safety of the apparatus can be further enhanced.

(8) The swing regulation member 94*c* serves not only as a push preventing member but also as a swing regulation member in combination with the engaging member 39. Therefore, the image forming apparatus has a simple configuration and low costs.

(9) The torsion spring 98 can apply an elastic force to the covering member 90 such that the covering member 90 acquires the covering position. Therefore, the opening 59 can be securely covered with the covering member 90.

(10) A part of the scanner 30 for containing a driving motor is projected downward so as to be contained in the space of the support 52. Therefore, the apparatus has a small size.

(11) Since the support has a release preventing member, a problem in that the upper unit is separated from the support and image forming section can be avoided even when a user applies an upward force or a force in the sliding direction to the upper unit.

(12) The upper combination 26 includes the scanner 30, and therefore a complex image forming apparatus which has a scanner and which has good safety can be provided.

(13) The upper combination 26 includes the automatic document feeder 32, and therefore a complex image forming apparatus which has an ADF and which has good safety can be provided.

(14) The image forming section has a main body and an upper cover. Regardless of the position of the slidable scanner, the upper unit can be opened and closed because the upper unit is attached to the main body via the upper cover 18. Therefore, replacement of consumable supplies and removal of jammed sheets can be easily performed, i.e., the image forming apparatus has good operability. In addition, since the upper cover 18 has a sheet bearing surface 41, the image forming apparatus has a small size.

The present invention is not limited to the above-mentioned examples, and can apply to any cavity type image forming apparatus. For example, the present invention can apply to monochrome copiers, monochrome laser printers, inkjet printers, direct-transfer type tandem color image forming apparatuses in which color images formed on image bearing members are transferred one by one onto a receiving sheet, etc. In addition, the image bearing member is not limited to a photoreceptor drum, and endless-belt-form image bearing members can also be used. Further, the copy discharging direction is not limited to the direction Xa, and may be the direction Xb or Y. Namely, the present invention can apply to not only to cavity type image forming apparatuses but also image forming apparatuses in which the upper unit thereof is slid relative to the main body. Furthermore, a plate (top board) may be provided instead of the scanner. In this case, a scanner may be fixedly set on the plate. Particularly, the present invention is useful for small-size cavity type image forming apparatuses.

This document claims priority and contains subject matter related to Japanese Patent Applications Nos. 2007-165544, 2007-180236, 2008-019844 and 2008-021959, filed on Jun. 22, 2007, Jul. 9, 2007, Jan. 30, 2008 and Jan. 31, 2008, respectively, incorporated herein by reference.

Having now fully described the invention, it will be apparent to one of ordinary skill in the art that many changes and modifications can be made thereto without departing from the spirit and scope of the invention as set forth therein.

What is claimed is:

1. An image forming apparatus comprising:

an image forming section configured to form an image on a sheet;

an upper unit which is located over the image forming section with a space therebetween and which is slid in a first direction of from a front side to a rear side of the image forming apparatus and a second direction of from the rear side to the front side thereof;

a sheet discharger configured to discharge the sheet bearing the image thereon into the space in the first or second direction;

a sheet stacker configured to receive the sheet from the sheet discharger to store the sheet thereon;

a support which is located on both side ends of the sheet stacker, such that the sheet is discharged between side portions of the support, and extends in the first direction and supports the upper unit so that the upper unit is slid in the first and second directions; and at least one of a release preventing member which forms part of the support and is configured to prevent releasing of the upper unit from the support and a covering member hinged to the support and which is moved from a first position to a second position in conjunction with sliding of the upper unit and which covers an opening in an end portion of the support when acquiring the first position.

2. The image forming apparatus according to claim 1, wherein the upper unit can be detachably attached to the support in the first or second direction.

3. The image forming apparatus according to claim 1, wherein the upper unit is attached to and detached from the image forming apparatus from the rear side of the image forming apparatus.

4. The image forming apparatus according to claim 1, wherein the upper unit includes a sliding member having a sliding surface on a bottom surface thereof, and the support includes a surface on which the sliding surface of the sliding member slides.

5. The image forming apparatus according to claim 1, wherein the release preventing member is integrated with the support.

6. The image forming apparatus according to claim 1, wherein the support includes a first support and a second support separately arranged outside of both the side ends of the sheet stacker, and wherein each of the first and second supports has the release preventing member.

7. The image forming apparatus according to claim 6, wherein the release preventing member is provided on an inside portion or an outside portion of each of the first and second supports.

8. The image forming apparatus according to claim 1, wherein the release preventing member has a front release preventing member on a front portion of the support and a rear release preventing member on a rear portion of the support.

9. The image forming apparatus according to claim 8, wherein the front release preventing member is separated from the rear release preventing member.

10. The image forming apparatus according to claim 1, wherein the sheet stacker is located on a cover of the image forming section, and wherein the cover can be swingably opened relative to the image forming section together with the upper unit and the support.

11. The image forming apparatus according to claim 1, wherein the opening is formed on a front end portion of the support.

12. The image forming apparatus according to claim 11, wherein the front portion of the support includes:

a pair of side walls extending in the first direction; and a front wall extending in a direction perpendicular to the first direction, wherein the opening is surrounded by the pair of side walls and the front wall.

13. The image forming apparatus according to claim 1, wherein the covering member is engaged with an engaging member provided on the upper unit so that movement of the covering member is regulated.

14. The image forming apparatus according to claim 1, wherein the covering member is swingably supported by the image forming section.

15. The image forming apparatus according to claim 14, wherein the covering member includes a surface covering the opening when the covering member acquires the first position, and wherein the surface has a cylindrical or spherical surface having substantially a same axis as a swing axis of the covering member.

16. The image forming apparatus according to claim 15, wherein the covering member includes:

a push preventing member configured to support the surface of the covering member covering the opening without being dislocated when the covering member acquires the first position and the surface is pushed.

17. The image forming apparatus according to claim 1, wherein the covering member includes:

an elastic member configured to apply an elastic force to the covering member in such a direction that the covering member acquires the first position.

18. The image forming apparatus according to claim 1, wherein the upper unit has a projected portion on a bottom thereof, which extends downward, and wherein a tip of the projected portion is present on a lower level than an upper surface of the opening.

19. The image forming apparatus according to claim 18, wherein the upper unit includes:

an image reading device which is configured to read an image of an original to be reproduced as the image on the sheet and which includes a driving device configured to drive the image reading device, wherein at least a part of the driving device is arranged in the projected portion of the upper unit.

20. An image forming apparatus comprising:

an image forming section configured to form an image on a sheet;

an upper unit which is located over the image forming section with a space therebetween and which is slid in a first direction of from a front side to a rear side of the image forming apparatus and a second direction of from the rear side to the front side thereof;

a sheet discharger configured to discharge the sheet bearing the image thereon into the space in the first or second direction;

a sheet stacker configured to receive the sheet from the sheet discharger to store the sheet thereon;

a support which is located outside of both side ends of the sheet stacker and extends in the first direction and supports the upper unit so that the upper unit is slid in the first and second directions; and a covering member hinged to the support and which is moved from a first position to a second position in conjunction with sliding of the upper unit and which covers an opening formed in an end portion of the support when acquiring the first position.

* * * * *